US012802009B2

(12) United States Patent
Kishan et al.

(10) Patent No.: US 12,802,009 B2
(45) Date of Patent: Nov. 17, 2026

(54) GENERATIVE AI AGENTS FOR PROCESS FLOW AUTOMATION

(71) Applicant: SAP SE, Walldorf (DE)

(72) Inventors: Gopi Kishan, Bangalore (IN); Kavitha Krishnan, Bangalore (IN); Rohit Jalagadugula, Visakhapatnam (IN); Manoj Kumar, Panchkula (IN); Shaunak Kaushik, Bangalore (IN); Hari Kishan, Bangalore (IN)

(73) Assignee: SAP SE, Walldorf (DE)

( * ) Notice: Subject to any disclaimer, the term of this patent is extended or adjusted under 35 U.S.C. 154(b) by 38 days.

(21) Appl. No.: 18/905,748

(22) Filed: Oct. 3, 2024

(65) Prior Publication Data

US 2026/0099791 A1 Apr. 9, 2026

(51) Int. Cl.
*G06Q 10/0633* (2023.01)

(52) U.S. Cl.
CPC ................................ *G06Q 10/0633* (2013.01)

(58) Field of Classification Search
CPC .. G06F 16/3344; G06F 16/3347; G06F 16/80; G06F 16/81; G06F 16/838; G06F 40/20; G06F 40/40; G06F 40/221; G06F 40/226; G06F 40/42; G06Q 10/0633
USPC ........................................................ 705/7.27
See application file for complete search history.

(56) References Cited

U.S. PATENT DOCUMENTS 11,435,871 B1 * 9/2022 Luvaas ............... G06F 3/04817
12,675,540 B2 * 7/2026 Jiao ..................... G06F 16/9535
2022/0130380 A1 4/2022 Touati
2024/0062016 A1 2/2024 Tong et al.
2024/0370477 A1 * 11/2024 Taylert .................... G06F 40/40
2025/0077798 A1 * 3/2025 Carluccio ............... G06F 9/453
2025/0094132 A1 3/2025 Cappetta
2025/0094465 A1 * 3/2025 Xu ........................ G06F 16/383

(Continued)

FOREIGN PATENT DOCUMENTS

CN 117472552 A 1/2024

OTHER PUBLICATIONS

Yao et al., "ReAct: Synergizing Reasoning and Acting in Language Models," arXiv:2210.03629v3, https://react-lm.github.io/, 33 pages, Mar. 10, 2023.

(Continued)

*Primary Examiner* — William S Brockington, III
*Assistant Examiner* — Letoria G Knight
(74) *Attorney, Agent, or Firm* — Klarquist Sparkman, LLP

(57) ABSTRACT

A computer-implemented method for improving workflow automation is disclosed. The method can receive a workflow including one or more processes. A process includes a plurality of tasks and links connecting the plurality of tasks. The links define an operation sequence of the plurality of tasks. The method can generate text descriptions of the one or more processes using a large language model and bind a set of tools to the workflow. The set of tools specify application programming interfaces used to perform tasks involved in the workflow. The method can create an autonomous agent configured to execute a selected task of the workflow responding to a user query. The autonomous agent identifies the selected task by comparing the user query and the text descriptions of the one or more processes. Related systems and software for implementing the method are also disclosed.

11 Claims, 11 Drawing Sheets

(56) References Cited

U.S. PATENT DOCUMENTS

| | | | | |
|---|---|---|---|---|
| 2025/0103910 | A1* | 3/2025 | Turley | G06N 20/00 |
| 2025/0104017 | A1* | 3/2025 | Peter | G06Q 30/015 |
| 2025/0217753 | A1* | 7/2025 | Makhija | G06Q 10/06315 |
| 2025/0307640 | A1* | 10/2025 | Belgi | G06N 3/0895 |
| 2025/0348360 | A1* | 11/2025 | Abadi | G06F 9/5027 |
| 2025/0362978 | A1* | 11/2025 | Chouta | G06F 9/541 |
| 2026/0087010 | A1* | 3/2026 | Agarwal | G06F 16/24542 |
| 2026/0087266 | A1* | 3/2026 | Kutty | G06F 40/279 |

OTHER PUBLICATIONS

Gel, "BPMN's Pool and Lanes—A Quick Overview," https://goodelearning.com/bpmns-pool-and-lanes-a-quick-overview/, 5 pages, Sep. 22, 2016.

"Workflow management: A beginner's guide to workflow automation and business process management," https://www.sap.com/products/technology-platform/workflow-management.html, 10 pages (accessed Aug. 15, 2024).

Tilson, "Workflows & BPMN, An Introductory Primer for the Uninitiated," https://medium.com/@justintilson/workflows-bpmn-32a05c11757a, 11 pages (accessed Aug. 15, 2024).

"SAP BTP Connectivity," https://help.sap.com/docs/CP_CONNECTIVITY/cca91383641e40ffbe03bdc78f00f681?locale=en-US&state=PRODUCTION&version=Cloud, 34 pages (accessed Aug. 14, 2024).

Camunda, "BPMN 2.0 Symbol Reference," https:/ /camunda.com/bpmn/reference/, 32 pages (accessed Aug. 7, 2024).

SAP, "Joule Capabilities," 42 pages (accessed Oct. 3, 2024).

Gupta, "Demystifying Joule—SAP's Generative AI Copilot," https://community.sap.com/t5/technology-blogs-by-sap/demystifying-joule-sap-s-generative-ai-copilot/ba-p/13581304, 22 pages (accessed Aug. 7, 2024).

Kartha, "Beginner's Guide to Creating AI Agents With LangChain," https://vijaykumarkatha.medium.com/beginners-guide-to-creating-ai-agents-with-langchain-eaa5c10973e6, 12 pages (accessed Aug. 7, 2024).

Langchain, "LangGraph," https://blog.langchain.dev/langgraph/, 13 pages (accessed Aug. 7, 2024).

Pandey, "Understanding Agentic Concepts with LangChain and LangGraph," https://medium.com/@pankaj_pandey/understanding-agentic-concepts-with-langchain-and-langgraph-a63c2a0c440a, 18 pages (accessed Aug. 6, 2024).

Swagger, "OpenAPI Specification," https://swagger.io/specification/, 57 pages (accessed Aug. 6, 2024).

Aisera, "LLM Grounding: Innovation for Performance," https://aisera.com/blog/llm-grounding/, 13 pages (accessed Aug. 6, 2024).

Coveo, "LLM Grounding: Preparing GenAI for the Enterprise," https://www.coveo.com/blog/dynamic-grounding/, 12 pages, Apr. 9, 2024.

Wikipedia, "Business Process Model and Notation," https://en.wikipedia.org/wiki/Business_Process_Model_and_Notation, 15 pages (accessed Jul. 30, 2024).

Zeng et al., "FlowMind: Automatic Workflow Generation with LLMs," In Proceedings of the Fourth ACM International Conference on AI in Finance, pp. 73-81, 2023.

Vidgof, "Large Language Models for Business Process Management: Opportunities and Challenges," In International Conference on Business Process Management Forum, pp. 107-122, Sep. 1, 2023.

* cited by examiner

GENERATIVE AI AGENTS FOR PROCESS FLOW AUTOMATION

BACKGROUND

Enterprise Resource Planning (ERP) systems are comprehensive software solutions that manage and integrate a company's financials, supply chain, operations, reporting, manufacturing, and human resource activities. These ERP systems often involve complex business process workflows, also referred to as "process flows" or simply "workflows," which can be challenging to navigate. The complexity of these workflows is not only within individual processes but also in the interconnections between different processes. For users who are not familiar with these workflows, navigating through this labyrinth can be daunting, leading to potential errors and inefficiencies. Thus, room for improvements exists for providing more intuitive guidance for users to interact with workflows in ERP systems.

DETAILED DESCRIPTION

Figure 1:
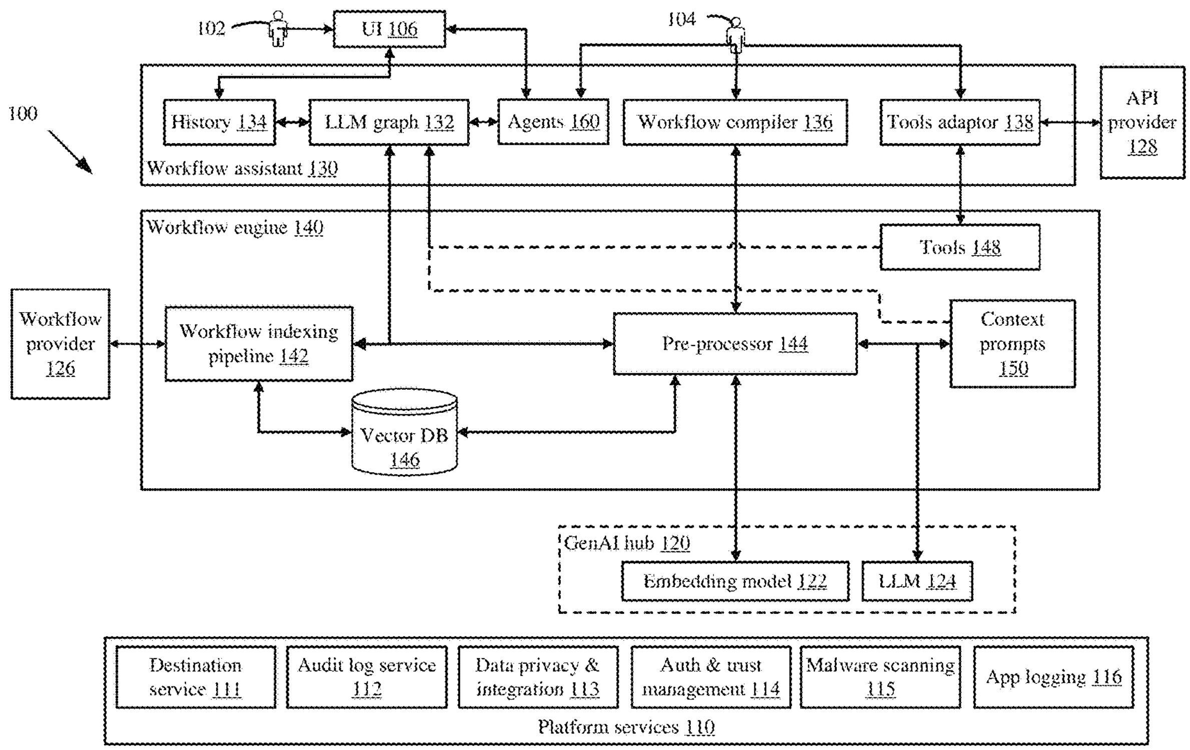
FIG. 1 is an overall block diagram of an example ERP system for improved process flow automation.

Overview of Workflow Automation in ERP Systems

ERP systems allow organizations to use a system of integrated applications to manage their business and automate many back-office functions related to technology, services and human resources.

ERP systems often use workflows to define and manage different business processes. Example workflows include approving a purchase order, authorizing a vacation request, processing a bill payment, hiring an employee, requesting a replacement part, sending an invoice to a customer, etc. As described herein, a workflow can be defined as a sequence of connected activities or tasks that need to be completed to achieve a particular result. A structured workflow follows a distinct path, which may be sequential or parallel to meet specific dependencies or requirements. In some circumstances, the path of a workflow can have defined variations, unique to each desired business outcome.

Workflows can be very complex. For example, a workflow can involve multiple participants, each participant representing an entity (e.g., a company, company division, a customer, etc.) or a business role (e.g., a buyer, a seller, a manufacturer, etc.) that controls or is responsible for a specific process. The process of each participant can include a mixture of serial and parallel tasks, where some tasks must be completed in a specific order, while others can be carried out simultaneously. The tasks in each process can be arranged in distributed patterns, depending on the nature of the tasks and the dependencies between them. In some circumstances, the tasks in each process can be grouped into a multitude of sub-processes. Each sub-process can be handled by a specific role (e.g., a person, a business unit, etc.) of the participant. Different roles can collaborate with each other by coordinating their respective sub-processes. Additionally, the tasks in each process might require different levels of authorization, data input, or interaction with other systems within the ERP environment. In some cases, user intervention may be required for certain tasks, especially when decisions or approvals are necessary. In some cases, workflows may also include automated decision-making steps, where predefined rules can determine the next course of action without human intervention. Further, a workflow can include various communication channels, such as email notifications, alerts, and task reminders, to ensure timely completion and coordination between participants (and their corresponding processes).

A complex workflow can have dozens of participants (processes) and each process can have hundreds of tasks. The complexity of these workflows can pose significant challenges for users, especially in large organizations where numerous workflows may exist for different processes. Navigating through the labyrinth of interconnected processes and tasks can be daunting, particularly for users who are not familiar with the intricacies of the system. This complexity can lead to potential errors and inefficiencies, impacting productivity and the overall effectiveness of the ERP system.

Recent advancements in generative artificial intelligence (AI), such as large language models (LLMs), offer new possibilities for ERP systems. The technologies described herein leverage the power of generative AI to improve workflow automation in ERP systems. Specifically, as described more fully below, autonomous agents can be created on the ERP systems to automatically handle certain tasks and make data-driven decisions. The autonomous agents can also provide intuitive guidance for users by offering step-by-step assistance, context-aware suggestions, and real-time feedback, reducing the complexity and learning curve associated with navigating intricate workflows. This not only enhances user experience but also ensures that workflows are executed consistently and accurately, minimizing the risk of human error and improving overall operational efficiency.

Example ERP System with Generative AI Agents for Workflow Automation

FIG. 1 shows an overall block diagram of an example ERP system 100 supporting generative AI agents for improved workflow automation.

The ERP system 100 includes a plurality of platform services 110. Example platform services 110 include destination service 111 (for handling connectivity to external systems and services), audit log service 112 (for recording and storing system activities for tracking and compliance), data privacy and integration service 113 (for managing data protection and facilitates data integration across platforms), authorization and trust management service 114 (for controlling user authentication and authorization), malware scanning service 115 (for detecting and mitigating potential malware threats), application logging service 116 (for capturing and storing application-level events for monitoring and troubleshooting), among others.

A generative AI hub 120 can be used provide generative AI capabilities to the ERP system 100. In some examples, the generative AI hub 120 can be hosted externally (e.g., on a third-party platform). In other examples, the generative AI hub 120 can be deployed locally on the ERP system 100. The generative AI hub 120 can include an embedding model 122 and a large language model, or LLM 124. The embedding model 122 is configured to transform input text into a dense vector representation that captures semantic meaning of the input text. Example embedding model 122 can be text-embedding-ada-002, BERT, FastText, Word2Vec, GloVe, or the like. The LLM 124 is configured to generate natural language text or responses based on input prompts. Example LLM 124 can be GPT-4 or BERT-based models, or the like. Although in the depicted examples the embedding model 122 and LLM 124 are shown as two different units, in other examples, the embedding model can be a component of the LLM.

The ERP system 100 includes a workflow assistant 130 and a workflow engine 140. The workflow assistant 130 can be a frontend application which can be used during design phase by a system administrator 104 to create autonomous agents (also referred to as "generative AI agents") for specific workflows and deploy these autonomous agents on the ERP system 100. The workflow assistant 130 can also be used during runtime phase by an end user 102 to utilize the deployed autonomous agents to process or interact with specific workflows. The workflow engine 140 can be a backend application configured to support creation, deployment, and runtime operation of the autonomous engines through communication with the workflow assistant 130.

Figure 5:
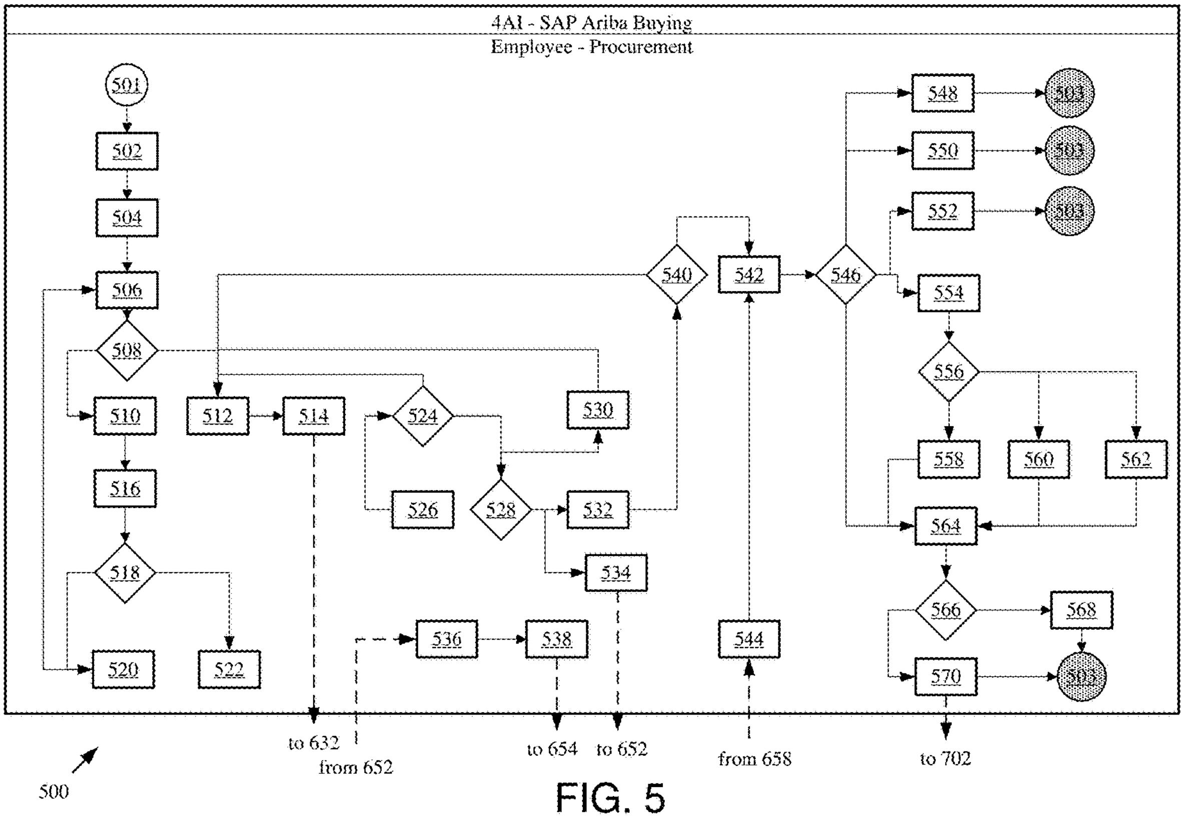
FIG. 5 is a block diagram depicting one process included in an example process flow.
Figure 6:
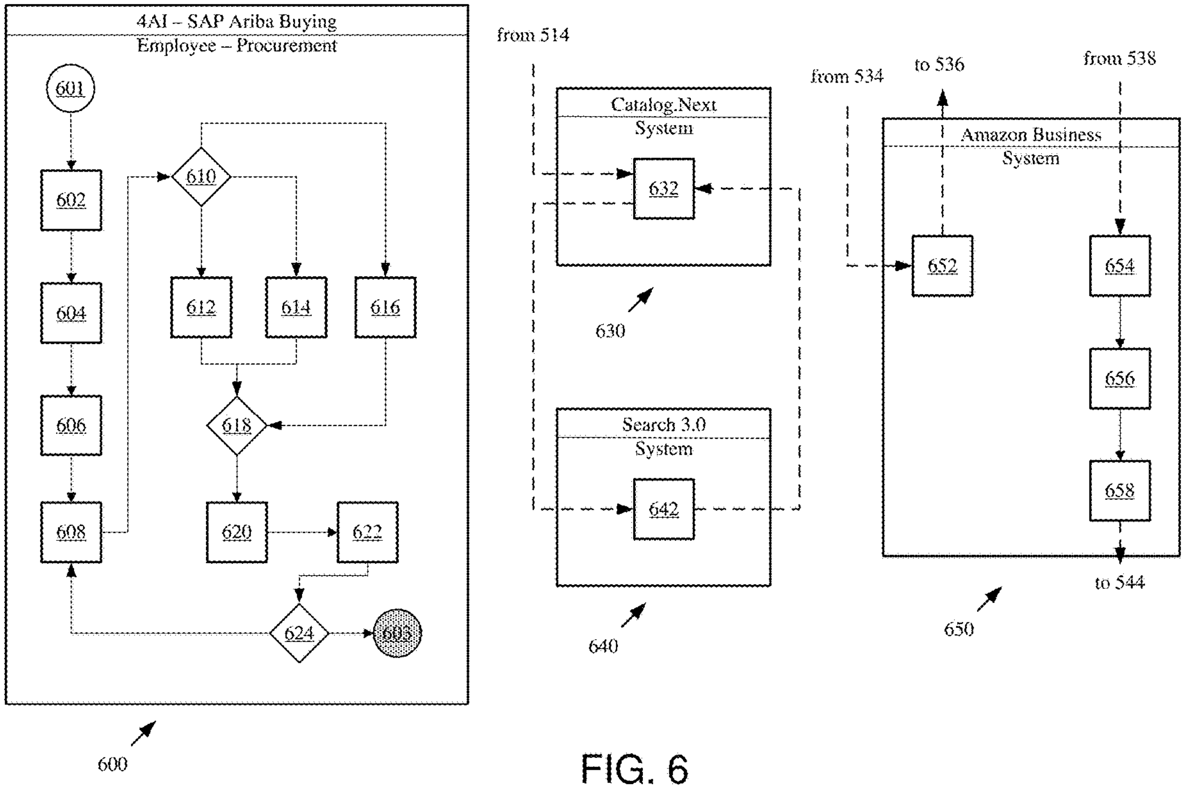
FIG. 6 is a block diagram depicting four additional processes included in the example process flow of FIG. 5.
Figure 7:
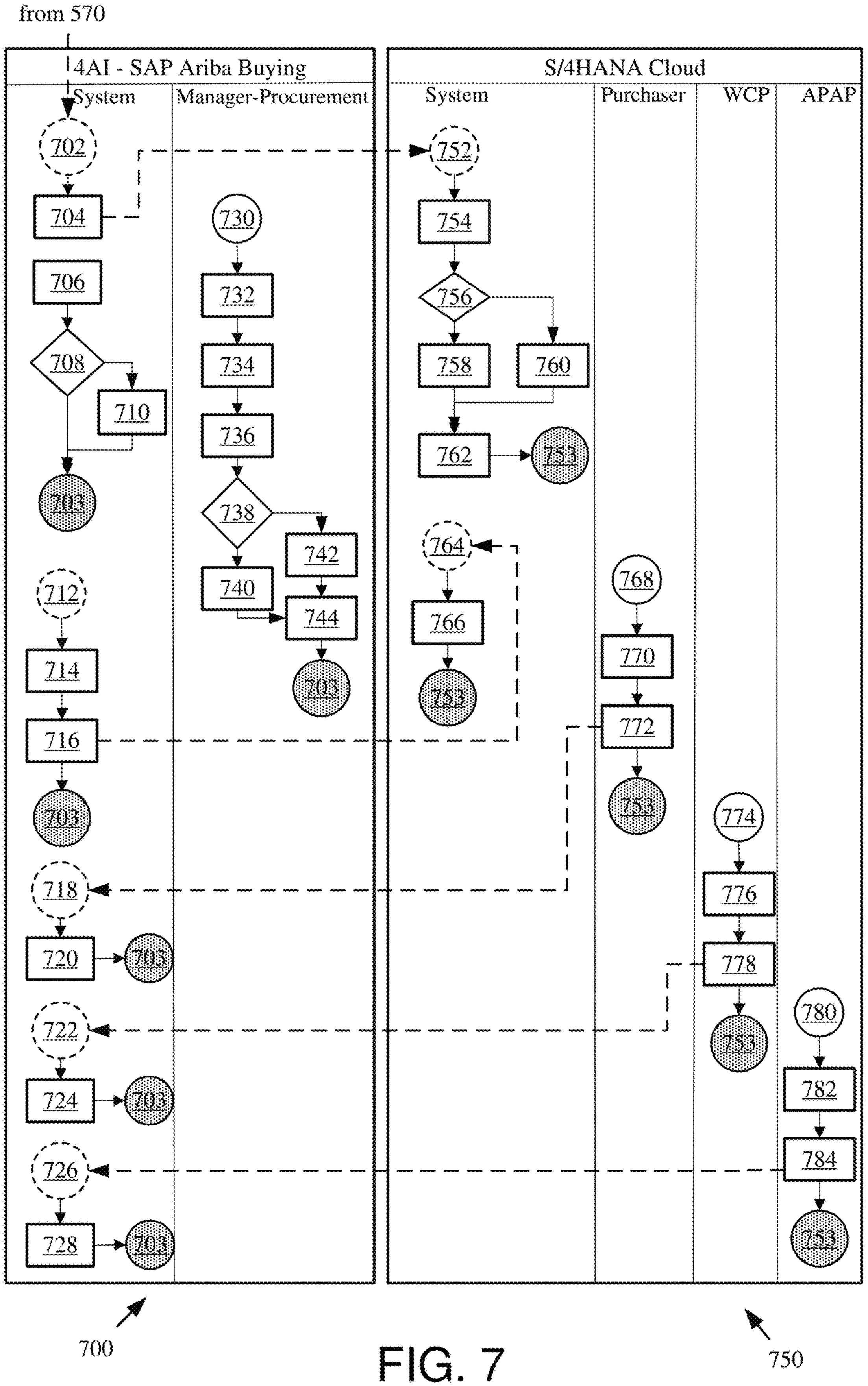
FIG. 7 is a block diagram depicting two additional processes included in the example process flow of FIG. 5.

During the design phase, the administrator 104 can utilize a workflow compiler 136 of the workflow assistant 130 to manage compilation of workflows provided by a workflow provider 126. As described above, a workflow can include one or more processes (e.g., respectively handled by one or more participants). A given process can include a plurality of tasks and links connecting the plurality of tasks. The links can define an operation sequence of the plurality of tasks. In some examples, a workflow can be represented as a graph, such as in Business Process Model and Notation (BPMN), where nodes represent tasks and edges represent the flow between them. Graphical representation of an example workflow is depicted in FIGS. 5-7 and described further below. Additionally, the workflow can be defined using a markup language like XML, which allows for the structured description of the processes, tasks, and their interconnections in a machine-readable format.

Compilation of a specific workflow can be performed by a workflow indexing pipeline 142 and a data pre-processor 144 of the workflow engine 140. The workflow indexing pipeline 142 can be configured to parse the markup language definition of the workflow and represent each process in the workflow as a set of nodes in a process object. The set of nodes in the process object represent the tasks of the process and can be organized in a hierarchical relationship representing the operation sequence of the tasks. In some examples, the process object can be represented in a data exchange format, such as JavaScript Object Notation (JSON) or the like.

Compilation of a workflow includes generating a detailed text description for each process within the workflow. These descriptions provide a narrative of the tasks and their operation sequence, clarifying how each process is structured and functions within the overall workflow. In some examples, the pre-processor 144 can prompt the LLM 124 with a prompt including a process object representing a selected process in the workflow. The prompt can instruct the LLM 124 to generate a response that includes a text description of the selected process based on the information contained in the process object. This generated text description can also be referred to as a context prompt 150 corresponding to the selected process. Such context prompt 150 can provide contextual information to the autonomous agent during runtime phase, as described further below. For all processes in the workflow, their corresponding context prompts 150 collectively serve as a concise and informative summary that aids in understanding the workflow's components and their interrelationships.

Additionally, compilation of a workflow includes generating process vector embeddings based on the context prompts 150. A process vector embedding represents the multidimensional characteristics of the corresponding context prompt 150 in a vector space. For a workflow including multiple processes, each process is associated with one specific process vector embedding. In some examples, the pre-processor 144 can utilize the embedding model 122 to generate the process vector embeddings for all processes included in the workflow. The generated process vector embeddings for all processes across all workflows can then be stored and indexed in a vector database 146, enabling efficient retrieval and analysis of workflows based on their embedded characteristics.

During the design phase, the administrator 104 can also utilize a tools adaptor 138 of the workflow assistant 130 to generate a set of tools 148, which specify one or more application programming interfaces (APIs) used to perform tasks involved in a specific workflow. In some examples, the tools adaptor 138 can be configured to parse a document containing specifications of the APIs provided by an API provider 128 and represent each tool 148 as an API object. In some examples, the API objects may be expressed in a data exchange format such as JSON. In some examples, the document containing the API specifications could be an OpenAPI specification, such as Swagger, which provides a standardized description of the API endpoints, request parameters, response structures, and other relevant details necessary for invoking the APIs.

After the set of tools 148 is generated, the administrator 104 can bind these tools to a specific workflow. This binding allows the APIs specified by the tools 148 to be used to implement the tasks involved in the workflow. For each tool, the administrator 104 can define a class or code for invoking the corresponding API and receiving the return results from the API call. Different sets of tools 148 can be mapped to different workflows, providing flexibility and customization based on the requirements of each workflow. After the binding, the administrator 104 can create an autonomous agent 160 specific for the workflow and deploy it on the ERP system 100. This autonomous agent 160 is a software artifact acting as a virtual executor of the workflow, carrying out tasks of the workflow (e.g., tasks defined by the APIs of the bound tools). Different workflows can have different autonomous agents 160.

Once deployed, the autonomous agent 160 can be utilized by the end user 102 during runtime phase to execute various tasks involved in the workflow. During runtime phase, the end user 102 can communicate with the autonomous agent 160 through a user interface or UI 106. The UI 106 can be embodied as a chatbot powered by the LLM 124. Through the chatbot, the autonomous agent 160 can interact with the end user 102 in a conversation manner, guiding the user 102 to execute tasks in the workflow.

During runtime phase, the end user 102 can enter a user query (in natural language) related to a workflow through the UI 106. The autonomous agent 160 corresponding to the workflow can be activated in response to the user query. The activation of the autonomous agent 160 can instantiate an LLM graph 132. The LLM graph 132 can be a state machine such as LangGraph (a software tool within LangChain framework) and is configured to control the operations of a conversation session using the LLM 124. The LLM graph 132 can manage the flow of conversation, maintain the state of the dialogue and guide the progression based on user inputs and predefined rules. The LLM graph 132 can interpret the user's natural language query, determine the appropriate response or action, and generate a natural language response, thus allowing for dynamic and interactive conversations between the end user 102 and the autonomous agent 160.

The LLM graph 132 can also maintain the context of the conversation, thus ensuring that the responses are contextually relevant and coherent. In some examples, the LLM graph 132 can obtain context information from a conversation history 134, which includes all previous user queries and corresponding responses (also referred to as conversation sessions) generated during the conversation session. The conversation history 134 can be recorded in a memory or other computer-readable media by the autonomous agent 160. In some examples, the context information can also be obtained from context prompts 150, which provide text descriptions of all processes involved in the workflow. Providing context prompts 150 to the LLM graph 132 enables the autonomous agent 160 to understand the workflow's components and their interrelationships, thereby facilitating accurate and contextually appropriate responses during the conversation session.

The autonomous agent 160 can determine which process (also referred to as a "target process") in the workflow needs to be involved to generate a proper response for the received user query. This can be achieved by comparing the user query and the context prompts 150. Specifically, the autonomous agent 160 can be configured to generate a query vector embedding based on the user query and measure similarities between the query vector embedding and the process vector embeddings stored in the vector database 146. For example, the autonomous agent 160 can request the pre-processor 144 to first convert the user query into the query vector embedding using the embedding model 122, and then measure similarity scores (e.g., cosine similarity) between the query vector embedding and each of the process vector embeddings stored in the vector database 146. The process with the highest similarity score can be identified as a target process.

In some examples, responding to the user query would require the autonomous agent 160 to execute a selected task of the target process. The autonomous agent 160 can determine the selected task by prompting the LLM 124 with both the user query and the context prompt 150 (text description) corresponding to the target process. Additionally, the autonomous agent 160 can provide the LLM 124 with the set of tools 148 bound to the workflow and instruct the LLM 124 to identify if any of the APIs specified in the tools 148 can be used to execute the selected task. In response, the LLM 124 can notify the autonomous agent 160 which API needs to be called to execute the selected task and related metadata (e.g., required API parameters, API endpoint, etc.). Based on the information provisioned by the tools 148, the autonomous agent 160 can then invoke the API to execute the selected task.

In certain scenarios, the autonomous agent 160 can autonomously execute the selected task (e.g., by calling the corresponding API) without user input. In other instances, user intervention may be necessary to execute a selected task, e.g., by requiring the user to provide additional data, confirm the execution of a critical operation, or resolve ambiguities in the user query. The autonomous agent 160 can use a conditional logic to determine the necessity of user intervention and dynamically adjusts the workflow to incorporate user inputs when required. For example, upon detecting that the selected task requires user intervention, the autonomous agent 160 can generate a prompt on the UI 106 to solicit the required input from the user. The execution of the API call will be contingent upon receiving this user input, such as confirmation or additional parameters. This mechanism ensures that tasks necessitating explicit user approval or supplementary information are managed correctly, while tasks that can be executed autonomously proceed without interruption.

In practice, the systems shown herein, such as the ERP system 100, can vary in complexity, with additional functionality, more complex components, and the like. For example, there can be additional functionality within the workflow engine 140 and/or workflow assistant 130. Additional components can be included to implement security, redundancy, load balancing, report design, data logging, and the like.

The described computing systems can be networked via wired or wireless network connections, including the Internet. Alternatively, systems can be connected through an intranet connection (e.g., in a corporate environment, government environment, or the like).

The ERP system 100 and any of the other systems described herein can be implemented in conjunction with any of the hardware components described herein, such as the computing systems described below (e.g., processing units, memory, and the like). In any of the examples herein, autonomous agents, workflows and processes, user query and context prompts, APIs, query and process vectors, and the like can be stored in one or more computer-readable storage media or computer-readable storage devices. The technologies described herein can be generic to the specifics of operating systems or hardware and can be applied in any variety of environments to take advantage of the described features.

Example Overall Method for Creating Generative AI Agents for Process Automation

Figure 2:
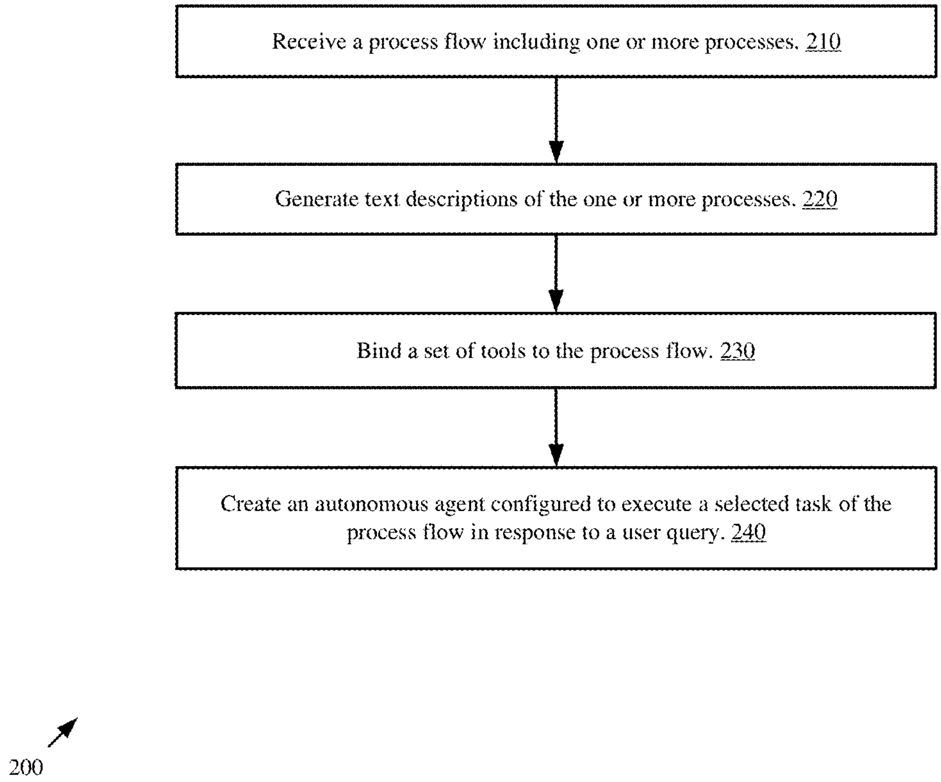
FIG. 2 is a flowchart illustrating an example overall method for creating an autonomous agent in an ERP system.

FIG. 2 is a flowchart illustrating an example overall method 200 for creating an autonomous agent in an ERP system, e.g., during the design phase. The method 200 can be performed, e.g., by the administrator 104 using the workflow assistant 130 and the workflow engine 140 of FIG. 1.

At step 210, the method can receive a workflow including one or more processes. As described above, a given process can include a plurality of tasks and links connecting the plurality of tasks. The links define an operation sequence of the plurality of tasks.

At step 220, the method can generate text descriptions (e.g., context prompts 150) of the one or more processes using an LLM (e.g., the LLM 124).

In some examples, the method can parse a markup language definition of the workflow and represent each process as a set of nodes in a process object. The set of nodes represent the tasks of the process and are organized in a hierarchical relationship representing the operation sequence of the tasks. In some examples, generating a text description of a selected process includes prompting the LLM with a prompt including a process object representing the selected process. Generating context prompts 150 (including parsing the markup language definition of the workflow and prompting the LLM to generate the text descriptions) can be automatically performed in real time.

In some examples, the method can generate process vector embeddings based on the text descriptions. Each process is associated with one specific process vector embedding. In some examples, the method can index the process vector embeddings in a vector database (e.g., the vector database 146). Generating process vector embeddings and indexing the same in the vector database can be performed automatically in real time.

At step 230, the method can bind a set of tools (e.g., tools 148) to the workflow. The set of tools specify one or more APIs used to perform tasks involved in the workflow.

In some examples, the method can parse a document containing specifications of the one or more APIs and represent each tool as an API object containing information of a corresponding API. Parsing the document can be performed automatically in real time.

Then, at step 240, the method can create an autonomous agent (e.g., the autonomous agent 160) and deploy the same on the ERP system. The autonomous agent is configured to execute a selected task of the workflow in response to a user query. The autonomous agent can identify the selected task based on comparison of the user query and the text descriptions of the one or more processes.

The method 200 and any of the other methods described herein can be performed by computer-executable instructions (e.g., causing a computing system to perform the method) stored in one or more computer-readable media (e.g., storage or other tangible media) or stored in one or more computer-readable storage devices. Such methods can be performed in software, firmware, hardware, or combinations thereof. Such methods can be performed at least in part by a computing system (e.g., one or more computing devices).

The illustrated actions can be described from alternative perspectives while still implementing the technologies. For example, "send" can also be described as "receive" from a different perspective.

Example Overall Method for Workflow Automation Using Generative AI Agents

Figure 3:
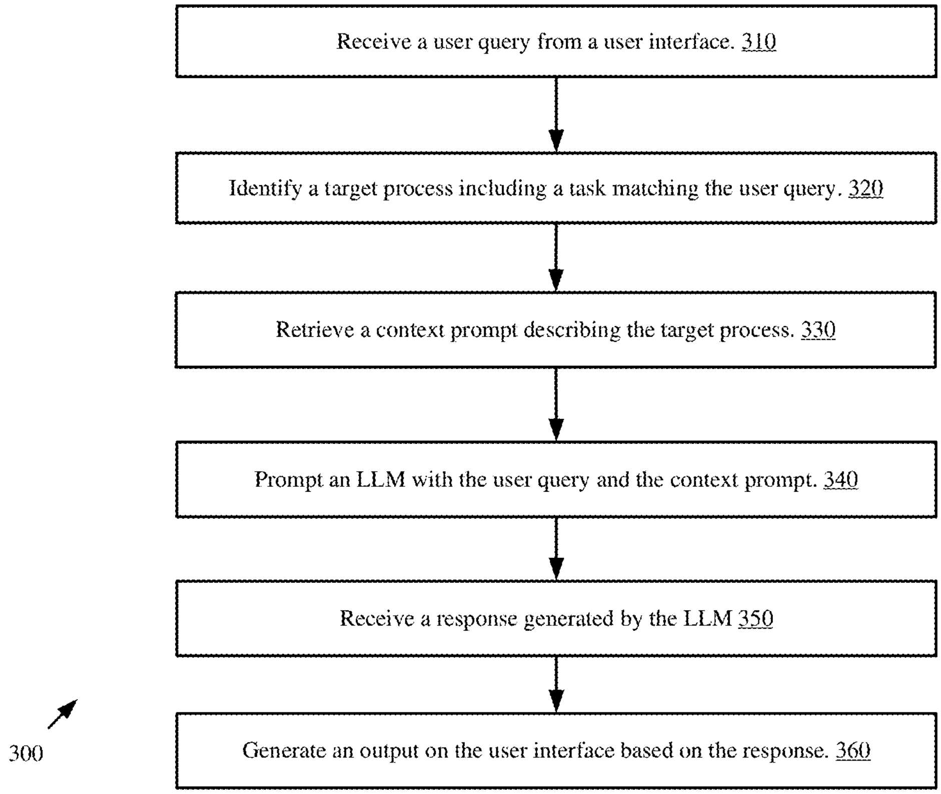
FIG. 3 is a flowchart illustrating an example overall method for using an autonomous agent deployed in an ERP system.

FIG. 3 is a flow diagram illustrating an example overall method 300 for workflow automation using the autonomous agent during runtime phase. The method 300 can be performed, e.g., by the end user 102 using the workflow assistant 130 and the workflow engine 140 of FIG. 1.

At step 310, the method can receive a user query from a user interface (e.g., the UI 106) of the ERP platform.

At step 320, the method can identify a target process including a selected task that matches the user query. The target process is one of a plurality of processes included in a process workflow. The target process includes a plurality of tasks and links connecting the plurality of tasks. The links define an operation sequence of the plurality of tasks.

In some examples, the method can embed the user query into a query vector. In some examples, identifying the target process includes measuring similarities between the query vector and a plurality of process vectors representing the plurality of processes included in the process workflow. The plurality of process vectors can be generated in advance during the design phase, as described above. Identifying the target process (including embedding the user query and measuring similarities) can be performed automatically in real time.

At step 330, the method can retrieve a text description or context prompt describing the target process. As described above, the context prompt describing the target process can be created in advance during the design phase.

At step 340, the method can prompt a LLM (e.g., the LLM 124) with the user query and the context prompt, e.g., to determine how to execute the selected task of the target process. In some examples, the method can provide the LLM with a set of tools bound to the workflow and instruct the LLM to identify if any of the APIs specified in the tools can be used to execute the selected task. The set of tools can be created in advance during the design phase, as described above.

In some examples, the user query is one of a plurality of user queries received in a query session. When prompting the LLM, the method can send a history of query session to the LLM. The history of the query session stores the plurality of user queries and corresponding responses generated by the large language model, thus providing additional context information of the user query. Prompting the LLM (including retrieving the set of tools and history of query session) can be performed automatically in real time.

At step 350, the method can receive a response generated by the LLM. In some examples, the method can detect whether the response specifies an API which needs to be called to execute the selected task. If an API call is necessary, the method can also determine from the response what metadata (e.g., required API parameters, API endpoint, etc.) is needed to invoke the API. In some examples, the method can further determine from the response whether invocation of the API requires a user intervention, such as requiring the user to provide additional data, confirm the execution of a critical operation, etc.

Then, at step 360, the method can generate an output on the user interface based on the response generated by the LLM. For example, if user interaction is not required, the method can automatically execute the selected task by calling the appropriate API and then present the result on the user interface. Alternatively, if user interaction is required, the method can prompt the user to confirm or provide additional information on the user interface. Based on the user's input, the method can either execute the selected task by invoking the API (if confirmed) or refrain from executing the API (if declined or not confirmed by the user). The corresponding results will then be presented on the user interface, ensuring that the user remains in control of selected task. The steps 350 and 360 can be performed automatically in real time by the autonomous agent.

Example Overview of LLMs and Prompts

Generative AI models, foundation models, and LLMs are interconnected concepts in the field of AI. Generative AI, a broad term, encompasses AI systems that generate content such as text, images, music, or code. Unlike discriminative AI models that aim to make decisions or predictions based on input data features, generative AI models focus on creating new data points. Foundation models are a subset of these generative AI models, serving as a starting point for developing more specialized models. LLMs, a specific type of generative AI, work with language and can understand and generate human-like text. In the context of generative AI, including LLMs, a prompt serves as an input or instruction that informs the AI of the desired content, context, or task. This allows users to guide the AI to produce tailored responses, explanations, or creative content based on the provided prompt.

In any of the examples herein, an LLM can take the form of an AI model that is designed to understand and generate human language. Such models typically leverage deep learning techniques such as transformer-based architectures to process language with a very large number (e.g., billions) of parameters. Examples include the Generative Pre-trained Transformer (GPT) developed by OpenAI, Bidirectional Encoder Representations from Transforms (BERT) by Google, A Robustly Optimized BERT Pretraining Approach developed by Facebook AI, Megatron-LM of NVIDIA, or the like. Pretrained models are available from a variety of sources.

In any of the examples herein, prompts can be provided, in real time, to LLMs to generate responses. Prompts in LLMs can be input instructions that guide model behavior. Prompts can be textual cues, questions, or statements that users provide to elicit desired responses from the LLMs. Prompts can act as primers for the model's generative process. Sources of prompts can include user-generated queries, predefined templates, or system-generated suggestions. Technically, prompts are tokenized and embedded into the model's input sequence, serving as conditioning signals for subsequent text generation. Experiment with prompt variations can be performed to manipulate output, using techniques like prefixing, temperature control, top-K sampling, chain-of-thought, etc. These prompts, sourced from diverse inputs and tailored strategies, enable users to influence LLM-generated content by shaping the underlying context and guiding the neural network's language generation. For example, prompts can include instructions and/or examples to encourage the LLMs to provide results in a desired style and/or format.

Example Architecture of LLM

Figure 4:
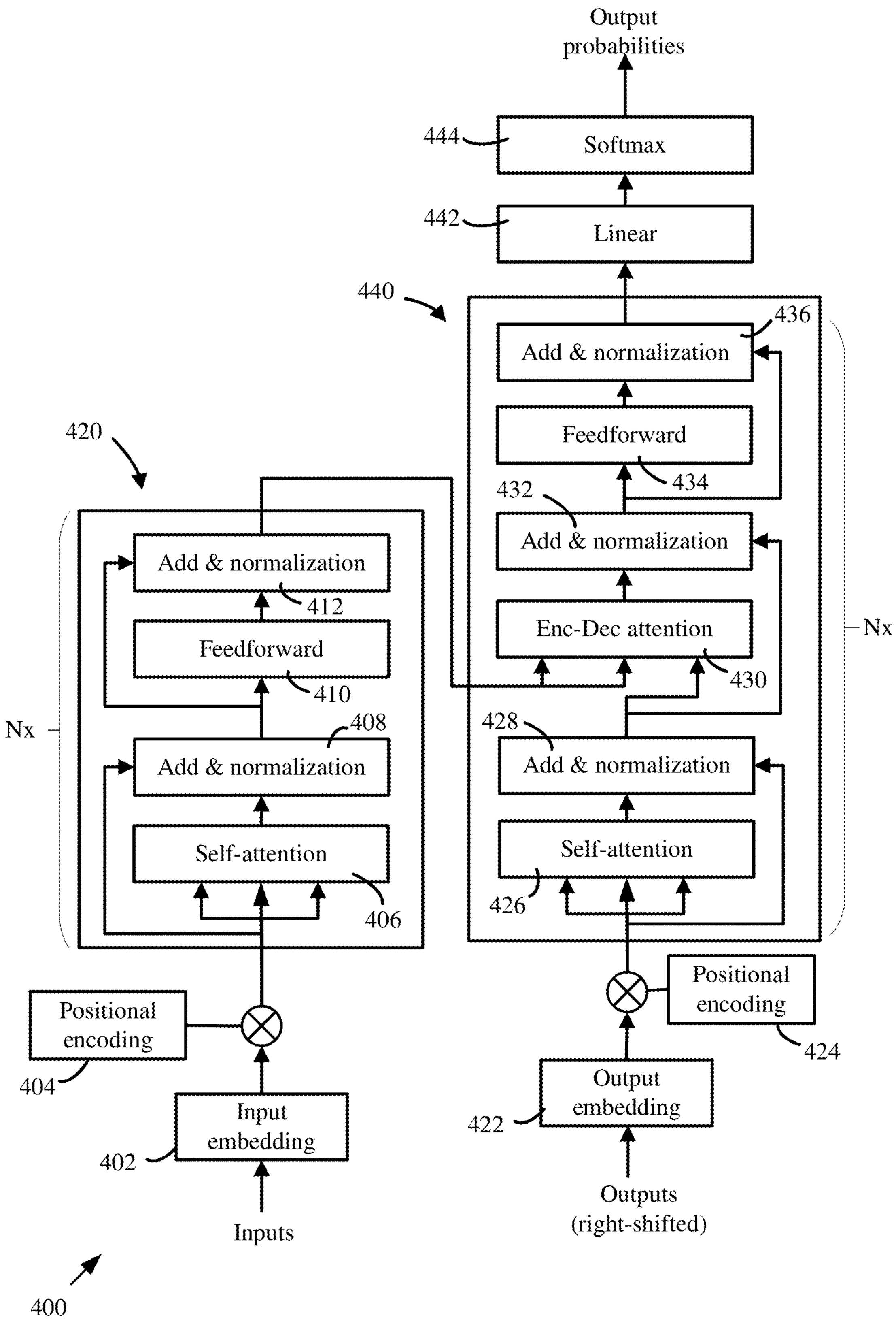
FIG. 4 is an architecture diagram of an example large language model.

FIG. 4 shows an example architecture of an LLM 400, which can be an embodiment of the LLM 124 of FIG. 1.

In the depicted example, the LLM 400 uses an autoregressive model (as implemented in OpenAI's GPT) to generate text content by predicting the next word in a sequence given the previous words. The LLM 400 can be trained to maximize the likelihood of each word in the training dataset, given its context.

As shown in FIG. 4, the LLM 400 can have an encoder 420 and a decoder 440, the combination of which can be referred to as a "transformer." The encoder 420 processes input text, transforming it into a context-rich representation. The decoder 440 takes this representation and generates text output.

For autoregressive text generation, the LLM 400 generates text in order, and for each word it generates, it relies on the preceding words for context. During training, the target or output sequence, which the model is learning to generate, is presented to the decoder 440. However, the output is right shifted by one position compared to what the decoder 440 has generated so far. In other words, the model sees the context of the previous words and is tasked with predicting the next word. As a result, the LLM 400 can learn to generate text in a left-to-right manner, which is how language is typically constructed.

Text inputs to the encoder 420 can be preprocessed through an input embedding unit 402. Specifically, the input embedding unit 402 can tokenize a text input into a sequence of tokens, each of which represents a word or part of a word. Each token can then be mapped to a fixed-length vector known as an input embedding, which provides a continuous representation that captures the meaning and context of the text input. Likewise, to train the LLM 400, the targets or output sequences presented to the decoder 440 can be preprocessed through an output embedding unit 422. Like the input embedding unit 402, the output embedding unit 422 can provide a continuous representation, or output embedding, for each token in the output sequences.

Generally, the vocabulary in LLM 400 is fixed and is derived from the training data. The vocabulary in LLM 400 consists of tokens generated above during the training process. Words not in the vocabulary cannot be output. These tokens are strung together to form sentences in the text output.

In some examples, positional encodings (e.g., 404 and 424) can be performed to provide sequential order information of tokens generated by the input embedding unit 402 and output embedding unit 422, respectively. Positional encoding is needed because the transformer, unlike recurrent neural networks, process all tokens in parallel and do not inherently capture the order of tokens. Without positional encoding, the model would treat a sentence as a collection of words, losing the context provided by the order of words. Positional encoding can be performed by mapping each position/index in a sequence to a unique vector, which is then added to the corresponding vector of input embedding or output embedding. By adding positional encoding to the input embedding, the model can understand the relative positions of words in a sentence. Similarly, by adding positional encoding to the output encoding, the model can maintain the order of words when generating text output.

Each of the encoder 420 and decoder 440 can include multiple stacked or repeated layers (denoted by Nx in FIG. 4). The number of stacked layers in the encoder 420 and/or decoder 440 can vary depending on the specific LLM architecture. Generally, a higher "N" typically means a deeper model, which can capture more complex patterns and dependencies in the data but may require more computational resources for training and inference. In some examples, the number of stacked layers in the encoder 420 can be the same as the number of stacked layers in the decoder 440. In other examples, the LLM 400 can be configured so that the encoder 420 and decoder 440 can have different numbers of layers. For example, a deeper encoder (more layers) can be used to better capture the input text's complexities while a shallower decoder (fewer layers) can be used if the output generation task is less complex).

The encoder 420 and the decoder 440 are related through shared embeddings and attention mechanisms, which allow the decoder 440 to access the contextual information generated by the encoder 420, enabling the LLM 400 to generate coherent and contextually accurate responses. In other words, the output of the encoder 420 can serve as a foundation upon which the decoder network can build the generated text.

Both the encoder 420 and decoder 440 comprise multiple layers of attention and feedforward neural networks. An attention neural network can implement an "attention" mechanism by calculating the relevance or importance of different words or tokens within an input sequence to a given word or token in an output sequence, enabling the model to focus on contextually relevant information while generating text. In other words, the attention neural network plays "attention" on certain parts of a sentence that are most relevant to the task of generating text output. A feedforward neural network can process and transform the information captured by the attention mechanism, applying non-linear transformations to the contextual embeddings of tokens, enabling the model to learn complex relationships in the data and generate more contextually accurate and expressive text.

In the example depicted in FIG. 4, the encoder 420 includes an intra-attention or self-attention neural network 406 and a feedforward neural network 410, and the decoder 440 includes a self-attention neural network 426 and a feedforward neural network 434. The self-attention neural networks 406, 426 allow the LLM 400 to weigh the importance of different words or tokens within the same input sequence (self-attention in the encoder 420) and between the input and output sequences (self-attention in the decoder 440), respectively.

In addition, the decoder 440 also includes an inter-attention or encoder-decoder attention neural network 430, which receives input from the output of the encoder 420. The encoder-decoder attention neural network 430 allows the decoder 440 to focus on relevant parts of the input sequence (output of the encoder 420) while generating the output sequence. As described below, the output of the encoder 420 is a continuous representation or embedding of the input sequence. By feeding the output of the encoder 420 to the encoder-decoder attention neural network 430, the contextual information and relationships captured in the input sequence (by the encoder 420) can be carried to the decoder 440. Such connection enables the decoder 440 to access to the entire input sequence, rather than just the last hidden state. Because the decoder 440 can attend to all words in the input sequence, the input information can be aligned with the generation of output to improve contextual accuracy of the generated text output.

In some examples, one or more of the attention neural networks (e.g., 406, 426, 430) can be configured to implement a single head attention mechanism, by which the model can capture relationships between words in an input sequence by assigning attention weights to each word based on its relevance to a target word. The term "single head" indicates that there is only one set of attention weights or one mechanism for capturing relationships between words in the input sequence. In some examples, one or more of the attention neural networks (e.g., 406, 426, 430) can be configured to implement a multi-head attention mechanism, by which multiple sets of attention weights, or "heads," in parallel to capture different aspects of the input sequence. Each head learns distinct relationships and dependencies within the input sequence. These multiple attention heads can enhance the model's ability to attend to various features and patterns, enabling it to understand complex, multi-faceted contexts, thereby leading to more accurate and contextually relevant text generation. The outputs from multiple heads can be concatenated or linearly combined to produce a final attention output.

As depicted in FIG. 4, both the encoder 420 and the decoder 440 can include one or more addition and normalization layers (e.g., the layers 408 and 412 in the encoder 420, the layers 428, 432, and 436 in the decoder 440). The addition layer, also known as a residual connection, can add the output of another layer (e.g., an attention neural network or a feedforward network) to its input. After the addition operation, a normalization operation can be performed by a corresponding normalization layer, which normalizes the features (e.g., making the features to have zero mean and unit variance), This can help in stabilizing the learning process and reducing training time.

A linear layer 442 at the output end of the decoder 440 can transform the output embeddings into the original input space. Specifically, the output embeddings produced by the decoder 440 are forwarded to the linear layer 442, which can transform the high-dimensional output embeddings into a space where each dimension corresponds to a word in the vocabulary of the LLM 400.

The output of the linear layer 442 can be fed to a softmax layer 444, which is configured to implement a softmax function, also known as softargmax or normalized exponential function, which is a generalization of the logistic function that compresses values into a given range. Specifically, the softmax layer 444 takes the output from the linear layer 442 (also known as logits) and transforms them into probabilities. These probabilities sum up to 1, and each probability corresponds to the likelihood of a particular word being the next word in the sequence. Typically, the word with the highest probability can be selected as the next word in the generated text output.

Still referring to FIG. 4, the general operation process for the LLM 400 to generate a reply or text output in response to a received prompt input is described below.

First, the input text is tokenized, e.g., by the input embedding unit 402, into a sequence of tokens, each representing a word or part of a word. Each token is then mapped to a fixed-length vector or input embedding. Then, positional encoding 404 is added to the input embeddings to retain information regarding the order of words in the input text.

Next, the input embeddings are processed by the self-attention neural network 406 of the encoder 420 to generate a set of hidden states. As described above, multi-head attention mechanism can be used to focus on different parts of the input sequence. The output from the self-attention neural network 406 is added to its input (residual connection) and then normalized at the addition and normalization layer 408.

Then, the feedforward neural network 410 is applied to each token independently. The feedforward neural network 410 includes fully connected layers with non-linear activation functions, allowing the model to capture complex interactions between tokens. The output from the feedforward neural network 410 is added its input (residual connection) and then normalized at the addition and normalization layer 412.

The decoder 440 uses the hidden states from the encoder 420 and its own previous output sequence to generate the next token in an autoregressive manner so that the sequential output is generated by attending to the previously generated tokens. Specifically, the output of the encoder 420 (input embeddings processed by the encoder 420) are fed to the encoder-decoder attention neural network 430 of the decoder 440, which allows the decoder 440 to attend to all words in the input sequence. As described above, the encoder-decoder attention neural network 430 can implement a multi-head attention mechanism, e.g., computing a weighted sum of all the encoded input vectors, with the most relevant vectors being attributed the highest weights.

The previous output sequence of the decoder 440 is first tokenized by the output embedding unit 422 to generate an output embedding for each token in the output sequence. Similarly, positional embedding 424 is added to the output embedding to retain information regarding the order of words in the output sequence.

The output embeddings are processed by the self-attention neural network 426 of the decoder 440 to generate a set of hidden states. The self-attention mechanism allows each token in the text output to attend to all tokens in the input sequence as well as all previous tokens in the output sequence. The output from the self-attention neural network 426 is added to its input (residual connection) and then normalized at the addition and normalization layer 428.

The encoder-decoder attention neural network 430 receives the output embeddings processed through the self-attention neural network 426 and the addition and normalization layer 428. Additionally, the encoder-decoder attention neural network 430 also receives the output from the addition and normalization layer 412 which represents input embeddings processed by the encoder 420. By considering both processed input embeddings and output embeddings, the output of the encoder-decoder attention neural network 430 represents an output embedding which takes into account both the input sequence and the previously generated outputs. As a result, the decoder 440 can generate the output sequence that is contextually aligned with the input sequence.

The output from the encoder-decoder attention neural network 430 is added to part of its input (residual connection), i.e., the output from the addition and normalization layer 428, and then normalized at the addition and normalization layer 432. The normalized output from the addition and normalization layer 432 is then passed through the feedforward neural network 434. The output of the feedforward neural network 434 is then added to its input (residual connection) and then normalized at the addition and normalization layer 436.

The processed output embeddings output by the decoder 440 are passed through the linear layer 442, which maps the high-dimensional output embeddings back to the size of the vocabulary, that is, it transforms the output embeddings into a space where each dimension corresponds to a word in the vocabulary. The softmax layer 444 then converts output of the linear layer 442 into probabilities, each of which corresponds to the likelihood of a particular word being the next word in the sequence. Finally, the LLM 400 samples an output token from the probability distribution generated by the softmax layer 444 (e.g., selecting the token with the highest probability), and this token is added to the sequence of generated tokens for the text output.

The steps described above are repeated for each new token until an end-of-sequence token is generated or a maximum length is reached. Additionally, if the encoder 420 and/or decoder 440 have multiple stacked layers, the steps performed by the encoder 420 and decoder 440 are repeated across each layer in the encoder 420 and the decoder 440 for generation of each new token.

Example Workflows

In a non-limiting example, FIGS. 5-7 depicts graphical representation of an example workflow named "4AI-SAP Ariba Buying" which illustrates the process flow within the SAP Ariba Buying, a procure-to-pay enterprise software solution provided by SAP, of Walldorf, Germany.

The "4AI-SAP Ariba Buying" workflow includes seven interconnected processes: a first process 500 titled "4AI-SAP Ariba Buying," a second process 600 titled "4AI-SAP Ariba Buying," a third process 630 titled "Catalog. Next," a fourth process 640 titled "Search 3.0," a fifth process 650 titled "Amazon Business," a sixth process 700 titled "4AI-SAP Ariba Buying," and a seventh process 750 titled "S/4HANA Cloud." In this example, the workflow is modelled using BPMN standard. Although different processes can have the same title (e.g., three processes 500, 600, 700 share the same title "4AI-SAP Ariba Buying"), the BPMN specifies each process with a unique identifier, also known as process reference number (processRef).

In BPMN, each process within a workflow is represented by a participant, which is a conceptual entity that performs specific tasks or activities. These participants are depicted within pools (denoted as bordered boxes), which serve as containers for a specific process or participant in the workflow. In some cases, a pool can be further divided into swim lanes (e.g., separated by vertical lines) that represent different roles, departments, or systems involved in the process, helping to distinguish responsibilities and task ownership within a single process. For example, the seventh process 750 includes four swim lanes representing four different roles: System, Purchaser, Warehouse Clerk—Procurement (WCP), and Accounts Payable Accountant—Procurement (APAP). In some cases, a pool can have only one swim lane. For example, the first process 500 has only one swim lane representing a single role Employee-Procurement.

The flow of a process in BPMN is depicted through nodes and links between them. Nodes represent the various elements in the process, such as events, activities, and gateways, while links (typically depicted as arrows) indicate the flow or sequence in which these elements occur. Different processes within the workflow can be linked to one another through message flows, which allow communication and data exchange between separate pools or participants, ensuring coordination and continuity across the interconnected processes. One example of inter-process communication is when a message flow triggers the start event of a subsequent process, initiating its execution based on the execution of a previous process. Another example of inter-process communication is when the subsequent process completes its tasks and returns the results or output back to the triggering process via a message flow, enabling further actions or decision-making within the original process.

Events in BPMN represent occurrences that can start, interrupt, or complete a process. Common event types include start events (indicating where a process begins), intermediate events (occurring between the start and end of a process), and end events (indicating where a process ends). Events can be triggered by various conditions such as messages, timers, or errors. Gateways in BPMN control the flow of the process, determining how it diverges and converges. Example gateway types include exclusive gateways (where only one path can be taken), parallel gateways (where multiple paths are executed simultaneously), and inclusive gateways (where one or more paths can be taken depending on conditions). Activities represent work that needs to be performed within the process. These can be either tasks, which are atomic activities, or sub-processes, which are activities composed of smaller tasks. Activities can be further classified based on their nature-manual tasks (requiring user intervention) and automated tasks (system tasks that are executed without user intervention). For instance, a user task might require an employee to approve a purchase order, while a system task might automatically generate a purchase requisition based on predefined criteria.

The table below list the nodes included in the first process 500 depicted in FIG. 5.

| |
|---|
| 501 Start of process 500 |
| 503 End of process 500 |
| 502 Log in SAP Ariba Buying |
| 504 Choose Create Purchase Request |
| 506 Go to the landing page |
| 508 Choose Catalog (go to 512) or Unlisted Item (go to 510)? |
| 510 Choose Request an Unlisted Item |
| 512 Search for items from the catalog content providers |
| 514 Connect to Catalog Search System (go to 632 of process 630) |
| 516 Enter values |
| 518 Continue (go to 522) or discard changes (go to 520)? |

-continued

| |
|---|
| 520 Discard changes |
| 522 Add with desired quantity |
| 524 Are search results acceptable (Yes-go to 528; No-go to 512)? |
| 526 Proceed with found results |
| 528 Continue with search results |
| 530 Refine search with required filters |
| 532 View the item details |
| 534 Search items from Amazon Business (go to 652 of process 650) |
| 536 View items from Amazon Business (return output from 652 of process 650) |
| 538 Buy from Amazon Business supplier (go to 654 of process 650) |
| 540 Proceed with one of the actions (search again-go to 512; checkout-go to 542 |
| 542 Cart checkout |
| 544 Add items to the card on Amazon Business (return from 658 of process 650) |
| 546 Continue with one of the following options (go to 548, 550, 552, 554, or 564) |
| 548 Choose Delete Request |
| 550 Choose Save as Draft |
| 552 Choose Delete an Item |
| 554 Choose Edit Item Details |
| 556 Continue with one of the following options (go to 558, 560, or 562) |
| 558 Update shipping, billing, and additional information |
| 560 Choose Add Comments |
| 560 Update Quantity |
| 564 Submit Request |
| 566 Request submitted successfully (Yes-go to 570; No-go to 568) |
| 568 Request submission failed with an error |
| 570 Request ID generated |

The table below list the nodes included in the processes 600, 630, 640, and 650 depicted in FIG. 6.

| |
|---|
| 601 Start of process 600 |
| 603 End of process 600 |
| 602 Log in to SAP Ariba Buying |
| 604 Choose Create Purchase Request |
| 606 Go to the landing page |
| 608 Go to Your Requests page |
| 610 Proceed with one of the actions (go to 612, 614, or 616) |
| 612 View requests that are in progress |
| 614 View requests that are saved as drafts |
| 616 View requests that are fulfilled and invoiced |
| 618 (Parallel gateway) |
| 620 Verify line item details |
| 622 Verify the item details, shipping, billing, and additional information sections |
| 624 See more item information (Yes-go to 608; No-go to 603) |
| 632 Connect to search 3.0 (receive input from 514 of process 500; go to 642 of process 640; return output from 642 of process 640) |
| 642 Search Catalogs (receive input from 632 of process 630; return results to 632 of process 630) |
| 652 Search for items from Amazon Business (receive input from 534 of process 500; return results to 536 of process 500) |
| 654 Add items to the cart on Amazon Business (receive input from 538 of process 500) |
| 656 Check out items on Amazon Business |
| 658 Transfer cart items from Amazon Business to SAP Ariba Buying (return results to 544 of process 500) |

The table below list the nodes included in the sixth and seventh processes 700 and 750 depicted in FIG. 7.

| |
|---|
| 702 Trigger start: Copy the request to SAP S/4HANA Cloud (trigger received from 570 of process 500) |
| 703 End of process 700 |
| 704 Copy request to SAP S/4HANA Cloud (trigger sent to 752 of process 750) |
| 706 Update status of request on SAP S/4HANA Cloud |
| 708 Purchase requisition created on SAP S/4HANA Cloud (Yes-go to 710; No-go to 703) |
| 710 Workflow process begins |
| 712 Trigger start: Update Approval Status |
| 714 Update the requisition with approval status |
| 716 Update approval status on SAP S/4HANA Cloud (trigger sent to 764 of process 750) |
| 718 Triggered start: Update Purchase Order creation status (trigger received from 772 of process 750) |
| 720 Update PO creation status |
| 722 Trigger start: Update GR creation status (trigger received from 778 of process 750) |
| 724 Update GR creation status |
| 726 Trigger start: Update invoice creation status (trigger received from 784 of process 750) |
| 728 Update Invoice creation status |
| 730 Start of process 700 by Manager-Procurement |
| 732 Login in SAP Ariba Buying |
| 734 Choose My Inbox - Shopping |
| 736 Select task for Approval |
| 738 Request approved (Yes-go to 740; No-go to 742) |
| 740 Item Approved |
| 742 Item Rejected |
| 744 Update Status |
| 752 Trigger start of process 750 (trigger received from 704 of process 700) |
| 753 End of process 750 |
| 754 Create Purchase Requisition (PR) |
| 756 Purchase Requisition created (Success-go to 758; Failed-go to 760) |
| 758 Request created |
| 760 Request failed |
| 762 Send response |
| 764 Trigger start: Update Approval Status (trigger received from 716 of process 700) |
| 766 Update the requisition with approval status |
| 768 Start of process 750 by Purchaser |
| 770 Purchase Order (PO) created |
| 772 Update PO creation status (trigger sent to 718 of process 700) |
| 774 Start of process 750 by WCP |
| 776 Goods Receipt (GR) created |
| 778 Update GR creation status (trigger sent to 722 of process 700) |
| 780 Start of process 750 by APCP |
| 782 Invoice created |
| 784 Update invoice creation status (trigger sent to 726 of process 700) |

It should be understood that the processes depicted in FIGS. 5-7 are merely examples for illustrating the complexity of workflows in ERP systems and do not limit the scope or applicability of other configurations or process flows that could be implemented within ERP systems.

Example Workflow Parser

In some examples, a workflow modelled using BPMN can be defined in a markup language such as XML. This markup language definition of the workflow can be parsed (e.g., by the workflow indexing pipeline 142) to convert each process in the workflow into a process object. Each process object includes a set of nodes organized hierarchically to represent the tasks within the process. In some examples, the process objects can be represented in JSON format.

An example Python code for implementing BPMN-to-JSON parser is listed below:

```
import xml.etree.ElementTree as ET
import json
class BPMNParser:
    def __init__(self):
```

-continued

```
        self.keys_to_remove = [
            "messageFlow",
            "id",
            "startQuantity",
            "completionQuantity",
            "isForCompensation",
            "isInterrupting",
        ]
        self.namespaces = "http://www.omg.org/spec/BPMN/20100524/MODEL"
    def get_element_by_id(self, element_id):
        for element in self.root.iter( ):
            if "id" in element.attrib and element.attrib["id"] == element_id:
                return element
        return None
    def find_process_id_by_flow_node(self, flow_node_id):
        namespaces = {"bpmn2": self.namespaces}
        for process in self.root.findall(".//bpmn2:process", namespaces):
            for flow_node_ref in process.findall(".//bpmn2:flowNodeRef", namespaces):
                if flow_node_ref.text == flow_node_id:
                    return process.get("id")
        return None
    def find_process_name(self, process_id):
        namespaces = {"bpmn2": self.namespaces}
        participant = self.root.find(
            f".//bpmn2:participant[@processRef='{process_id}']", namespaces
        )
        if participant is not None:
            return participant.get("name")
        else:
            return None
    def find_process_name_by_flow_node(self, flow_node_id):
        process_id = self.find_process_id_by_flow_node(flow_node_id)
        if process_id:
            return self.find_process_name(process_id)
        else:
            return None
    def find_lane_name(self, flow_node_ref):
        namespaces = {"bpmn2": self.namespaces}
        for lane in self.root.findall(".//bpmn2:lane", namespaces=namespaces):
            lane_name = lane.get("name")
            for node_ref in lane.findall(".//bpmn2:flowNodeRef", namespaces=namespaces):
                if node_ref.text == flow_node_ref:
                    return lane_name
        return None
    def remove_keys_from_dict(self, d):
        """
        Recursively remove all specified keys from the dictionary.
        """
        if isinstance(d, dict):
            for key in self.keys_to_remove:
                if key in d:
                    del d[key]
            for key, value in d.items( ):
                self.remove_keys_from_dict(value)
        elif isinstance(d, list):
            for item in d:
                self.remove_keys_from_dict(item)
    def remove_keys_from_json(self, json_string):
        data = json.loads(json_string)
        self.remove_keys_from_dict(data)
        return json.dumps(data)
    def xml_to_json(self, xml_content):
        self.root = ET.fromstring(xml_content)
        result = {"collaboration": {"participant": [ ], "messageFlow": [ ]}}
        bpmn2 = "{http://www.omg.org/spec/BPMN/20100524/MODEL}"
        collaboration = self.root.find(f"{bpmn2}collaboration")
        if collaboration is not None:
            for participant in collaboration.findall(f"{bpmn2}participant"):
                participant_name = participant.get("name")
                process_ref = participant.get("processRef")
                result["collaboration"]["participant"].append(
                    {"processRef": process_ref, "name": participant_name}
                )
            for message_flow in collaboration.findall(f"{bpmn2}messageFlow"):
                source_ref = message_flow.get("sourceRef")
                target_ref = message_flow.get("targetRef")
                sourceName = self.get_element_by_id(source_ref).attrib["name"]
                targetName = self.get_element_by_id(target_ref).attrib["name"]
                result["collaboration"]["messageFlow"].append(
```

-continued

```
            {
               "sourceRef": source_ref,
               "sourceName": sourceName,
               "targetRef": target_ref,
               "targetName": targetName,
            }
         )
    for process in self.root.findall(f"{bpmn2}process"):
       process_id = process.get("id")
       result[process_id] = {"node": [ ]}
       for elem in process:
          node_id = elem.get("id")
          node_type = elem.tag.split("}")[-1]
          name = elem.get("name", "")
          role = self.find_lane_name(node_id)
          if node_type in ["userTask", "serviceTask", "startEvent", "endEvent"]:
             incoming_ids = [i.text for i in elem.findall(f"{bpmn2}incoming")]
             outgoing_ids = [o.text for o in elem.findall(f"{bpmn2}outgoing")]
             outgoing_node_ids = [
                self.get_element_by_id(id).attrib["targetRef"]
                for id in outgoing_ids
             ]
             incoming_node_ids = [
                self.get_element_by_id(id).attrib["sourceRef"]
                for id in incoming_ids
             ]
             childNodes = [
                self.get_element_by_id(id).attrib for id in outgoing_node_ids
             ]
             parentNodes = [
                self.get_element_by_id(id).attrib for id in incoming_node_ids
             ]
             for msgflow in result["collaboration"]["messageFlow"]:
                tmpNode = { }
                if node_id == msgflow["sourceRef"]:
                   tmpNode = dict(
                      self.get_element_by_id(msgflow["targetRef"]).attrib
                   )
                   tmpNode["foreignProcessName"] = (
                      self.find_process_name_by_flow_node(
                         msgflow["targetRef"]
                      )
                   )
                   childNodes.append(tmpNode)
                elif node_id == msgflow["targetRef"]:
                   tmpNode = dict(
                      self.get_element_by_id(msgflow["sourceRef"]).attrib
                   )
                   tmpNode["foreignProcessName"] = (
                      self.find_process_name_by_flow_node(
                         msgflow["sourceRef"]
                      )
                   )
                   parentNodes.append(tmpNode)
             result[process_id]["node"].append(
                {
                   "id": node_id,
                   "nodeType": node_type,
                   "name": name,
                   "role": role,
                   "parentNode": parentNodes,
                   "childNode": childNodes,
                }
             )
    return self.remove_keys_from_json(json.dumps(result))
```

As described above, each process in the workflow can have a process reference number (processRef) specified in the BPMN. For example, parsing the BPMN of the workflow depicted in FIGS. 5-7 can identify the following seven participants corresponding to the seven processes described above (arranged in sequence of 630, 650, 750, 640, 500, 700, and 600), each associated with a unique processRef and a name (or title):

“participant”: [
  {
    “processRef”: “process-a911ed607-c0f1-4873-b516-d7e555b353e4”,
    “name”: “Catalog.Next”
  },
  {
    “processRef”: “process-a35111c8b-8c8d-4282-aa4f-8d3f680302be”,
    “name”: “Amazon Business”
  },
  {
    “processRef”: “process-a356b96cd-0c51-42b1-b66f-2f3e717dbaf4”,
    “name”: “S/4HANA Cloud”
  },
  {
    “processRef”: “process-a5ea058c-c659-44ea-9c86-99ad3fb50074”,
    “name”: “Search 3.0”
  },
  {
    “processRef”: “process-a122bd9c4-aca3-4fd4-9852-c21d466a0d81”,
    “name”: “4AI - SAP Ariba Buying”
  },
  {
    “processRef”: “process-cfacffad-b76e-4c1a-b0b5-e82121f2a39f”,
    “name”: “4AI - SAP Ariba Buying”
  },
  {

-continued

“processRef”: “process-ea03f20f-d688-4935-a337-8b5e56e820f2”,
    “name”: “4AI - SAP Ariba Buying”
  }
]

As an example, the following shows a portion of a JSON object representing a selected node 564 (“Submit Request”) in the first process 500:

{
  “nodeType”: “userTask”,
  “name”: “Submit Request”,
  “role”: “Employee - Procurement”,
  “parentNode”: [
    {
      “name”: “Continue with one of the following options”,
      “gatewayDirection”: “Unspecified”
    },
    {
      “name”: “Update Quantity”
    },
    {
      “name”: “Update shipping, billing, and additional Information”
    },
    {
      “name”: “Choose Add Comments”
    }
  ],
  “childNode”: [
    {
      “name”: “Request submitted successfully?”,
      “gatewayDirection”: “Unspecified”
    }
  ]
}

This portion of the JSON object is parsed from the following snippet of an BPMN model of the workflow:

<bpmn2:userTask id=“147fce26-267f-4fcf-9d3a-1c2a0ab293a1” name=“Submit Request” startQuantity=“0” completionQuantity=“0” isForCompensation=“false”>
  <bpmn2:incoming>a817c2a6-6d27-4c42-9b30-c1ad7c497301</bpmn2:incoming>
  <bpmn2:incoming>9884e88a-a377-476e-811e-11dae76c315e</bpmn2:incoming>
  <bpmn2:incoming>8b9dc04a-f325-4e00-bba4-e094b7039e90</bpmn2:incoming>
  <bpmn2:incoming>e5c84d61-fae1-4c81-9a44-f97737783995</bpmn2:incoming>
  <bpmn2:outgoing>d0eac370-3d88-442b-87c2-42f2cec209d6</bpmn2:outgoing>
</bpmn2:userTask>

As shown in FIG. 5, this portion of the JSON object indicates that the node 564 has four parent nodes (corresponding to nodes 546, 558, 560, and 562) and one child node (corresponding to node 566).

As another example, the parser can convert the fourth process 630 ("Catalog.Next") into the following JSON object:

```
"process-a911ed607-c0f1-4873-b516-d7e555b353e4": {
  "node": [
    {
      "nodeType": "serviceTask",
      "name": "Connect to search 3.0",
      "role": "System",
      "parentNode": [
        {
          "name": "Connect to Catalog Search System",
          "foreignProcessName": "4AI - SAP Ariba Buying"
        },
        {
          "name": "Search Catalogs",
          "foreignProcessName": "Search 3.0"
        }
      ],
      "childNode": [
        {
```

-continued

```
          "name": "Search Catalogs",
          "foreignProcessName": "Search 3.0"
        }
      ]
    }
  ]
```

As shown, this JSON object indicates that the node 632 ("Connect to search 3.0") is connected to a foreign process, which is the fourth process 640 titled "Search 3.0" through both parent and child relationships with the node 642 ("Search Catalogs").

Example Context Prompts

As described above, for each one of the process objects obtained from parsing the markup language definition of a workflow, a text description (or context prompt) of the workflow can be generated by prompting an LLM. The following shows an example Python code implementing generation of the context prompt for a specific process. In this example, the prompt sent to the LLM is built on a prompt template including a placeholder {process_data} which can be replaced with a JSON object (generated after parsing the BPMN workflow) representing a specific process.

```
process_prompt_list = [ ]
for process_ref, process_data in all_processes.items( ):
  prompt = f"{process_data} You are given tasks
  json for a process. Understand the tasks
and their dependencies through parentNode and childNode, and write a sequence flow of
the process. Strictly DO NOT leak any unique identifier or id."
  res = chat_llm.invoke(prompt)
  process_prompt_list.append(res.content)
process_prompt_list
```

In response, the LLM can generate a text description (context prompt) for the corresponding process. As examples, the following lists seven context prompts respectively generated corresponding to the seven processes depicted in FIGS. 5-7 (arranged in sequence of 630, 650, 750, 640, 500, 700, and 600).

---

'The process is named "Catalog.Next". \n\nThe sequence flow of the process is as follows:\n\n1. The process starts with a service task named "Connect to search 3.0". This task is performed by the system.\n\n2. This task is dependent on two parent nodes: "Connect to Catalog Search System" which is a part of the \'4AI - SAP Ariba Buying\' process and "Search Catalogs" which is a part of the \'Search 3.0\' process.\n\n3. Upon completion of the "Connect to search 3.0" task, it moves to its child node which is "Search Catalogs" in the \'Search 3.0\' process.\n\nSo, the process flow is: Connect to Catalog Search System (in \'4AI - SAP Ariba Buying\') and Search Catalogs (in \'Search 3.0\') –> Connect to search 3.0 –> Search Catalogs (in \'Search 3.0\').'

'The sequence flow of the Amazon Business process is as follows:\n\n1. The process starts with the task "Search for items from Amazon Business". This task does not have a specific role assigned. It is a part of the foreign process "4AI - SAP Ariba Buying" and its parent node is "Search items from Amazon Business shopping site". The output of this task is directed to another task named "View items from Amazon Business", which is part of the foreign process "4AI - SAP Ariba Buying".\n\n2. The next task is "Add items to the cart on Amazon Business". This task is performed by the System. It is a part of the parent node "Buy from Amazon Business supplier", which is a part of the foreign process "4AI - SAP Ariba Buying". The output of this task proceeds to the "Check out items on Amazon Business" task.\n\n3. The "Check out items on Amazon Business" task is also performed by the System. It has the "Add items to the cart on Amazon Business" task as its parent node. The output of this task is directed to the "Transfer cart items from Amazon Business to SAP Ariba Buying" task.\n\n4. The last task in the process is "Transfer cart items from Amazon Business to SAP Ariba Buying". This is a service task performed by the System. It has the "Check out items on Amazon Business" task as its parent node. The output of this task is directed to the "Add items to the cart on Amazon Business" task, which is a part of the foreign process "4AI - SAP Ariba Buying". \n\nThis completes the sequence flow of the Amazon Business process.'

'The sequence flow for the S/4HANA Cloud process flows as follows:\n\n1. The process begins with the System receiving a request to "Copy Request to SAP S/4HANA Cloud" from "4AI - SAP Ariba Buying" process. This triggers the start event.\n\n2. After the start event, the System proceeds to the service task to "Create Purchase Requisition (PR)".\n\n3. Upon creation of the Purchase Requisition (PR), the system checks if the "Purchase Requisition created?". This seems to be an internal gateway to validate the creation of the PR.\n\n4. The process diverges here into two potential pathways:\n\n a. If the Purchase Requisition is successfully created, the System proceeds to "Send response". This marks the successful end of this part of the process.\n \n b. If the Purchase Requisition creation fails, the system also proceeds to "Send response", presumably with an error message, and this marks the unsuccessful end of this part of the process.\n\n5. Another part of the process begins with the System receiving a request to "Update approval status on SAP S/4HANA Cloud" from "4AI - SAP Ariba Buying". This triggers the "Update Approval Status" start event.\n\n6. The System then performs the service task to "Update the requisition with approval status". Once this task is completed, the process ends for this part.\n\n7. In parallel to the System tasks, the Purchaser role starts with the event "Start Event 3". The Purchaser then performs the user task "Purchase Order (PO) created".\n\n8. The Purchaser then performs the service task to "Update PO creation status". Once this task is completed, the process ends for this part.\n\n9. Similarly, the Warehouse Clerk - Procurement role starts with the event "Start Event 31". The Warehouse Clerk then performs the user task "Goods Receipt (GR) created".\n\n10. The Warehouse Clerk then performs the service task to "Update GR creation status". Once this task is completed, the process ends for this part.\n\nIt\'s important to note that the tasks performed by the System, Purchaser, and Warehouse Clerk - Procurement roles may occur simultaneously or in any order as they do not seem to be dependent on each other.'

'The process "Search 3.0" begins with a service task named "Search Catalogs". This task is performed by the system.\n\nThe "Search Catalogs" task has dependencies with the task "Connect to search 3.0" in the \'Catalog.Next\' process. This indicates that before the "Search Catalogs" task is done, the task "Connect to search 3.0" in the \'Catalog.Next\' process must be completed. After the "Search Catalogs" task is performed, it connects back to the "Connect to search 3.0" task in the \'Catalog.Next\' process.\n\n The sequence flow of the process: \n1. Connect to search 3.0 (in Catalog.Next process)\n2. Search Catalogs (in Search 3.0 process)\n3. Connect back to search 3.0 (in Catalog.Next process) \n\nThis shows a cyclical relationship between the two processes, where the \'Search 3.0\' process is dependent on the \'Catalog.Next\' process to perform the \'Connect to search 3.0\' task before and after it performs its own \'Search Catalogs\' task.'

"The process starts with an 'Employee - Procurement' logging into SAP Ariba Buying. After login, the next task is to choose 'Create Purchase Request'. This leads to the next task which is to go to the landing page. \n\nFrom the landing page, the employee has the option to 'Choose Catalog or Unlisted Item?' If they choose to search for items, they can 'Proceed with found Results' or 'Refine search with required filters'. The employee also has the option to 'Search items from Amazon Business shopping site'. \n\nIf the search results are acceptable, they can 'Cart Checkout' and 'Submit Request'. Before submitting the request, they can choose to 'Edit Item Details', 'Update Quantity', 'Update shipping, billing, and additional Information', or 'Add Comments'. \n\nIf the employee chooses to request an unlisted item, they need to 'Enter values' and can either 'Continue' or 'Discard changes'. If they continue, they can 'Add with desired Quantity'.\n\nIn the case of shopping from Amazon Business, after viewing items from Amazon Business, they can 'Buy from Amazon Business supplier' and 'Add items to the cart on Amazon Business'. \n\nOnce the -continued request is submitted, it will either generate a ‘Request ID’ or fail with an error. In both cases, the process ends. Additionally, the process also ends if the employee chooses to ‘Delete an Item’, ‘Save as Draft’, or ‘Delete Request’. \n\nThis sequence flow represents the various tasks and their dependencies that an ‘Employee - Procurement’ performs in the ‘4AI - SAP Ariba Buying’ process.”
‘The sequence flow of the “4AI - SAP Ariba Buying” process is as follows:\n\n1. The process starts with the system generating a “Request ID” in the “4AI - SAP Ariba Buying” process.\n2. The “Copy the request to SAP S/4HANA Cloud” task is then initiated.\n3. This task involves the system copying the request to SAP S/4HANA Cloud.\n4. The next task is “Update status of request on SAP S/4HANA Cloud”. Here, the system updates the status of the request on SAP S/4HANA Cloud, leading to the creation of a purchase requisition on the SAP S/4HANA Cloud.\n5. The “Workflow process begins” task is then started by the system.\n6. Subsequently, the “Update Approval Status” task is initiated.\n7. In this task, the system first updates the requisition with approval status, and then updates the approval status on SAP S/4HANA Cloud. This task is linked with the “S/4HANA Cloud” process.\n8. The “Update PO creation status” task is then triggered. The system updates the purchase order (PO) creation status, which is also linked with the “S/4HANA Cloud” process.\n9. The “Update Invoice creation status” task is then initiated by the system.\n10. A manager with the role “Manager - Procurement” logs into SAP Ariba Buying.\n11. The manager then chooses “My Inbox - Shopping”.\n12. The manager selects the task for approval.\n13. Depending on whether the request is approved or not, the manager either approves or rejects the item.\n14. The manager then updates the status.\n15. The system also updates the Goods Receipt (GR) creation status.\n16. The process ends after all these tasks are completed.\n\nEach task in this process is connected to one or more other tasks, indicating their dependencies on each other. These tasks are interlinked through parent nodes and child nodes, representing the sequence of tasks in the workflow.’,
“The process is called “4AI - SAP Ariba Buying”. It starts with an employee in the procurement department. Here is the sequence flow of the process:\n\n1. The process begins with the \‘Start Event\’. The role involved in this stage is the VEmployee - Procurement\’.\n\n2. The \‘Employee - Procurement\’ logs in to SAP Ariba Buying.\n\n3. After logging in, the \‘Employee - Procurement\’ chooses \‘Create Purchase Request\’.\n\n4. The \‘Employee - Procurement\’ then goes to the landing page.\n\n5. Following this, the \‘Employee - Procurement\’ navigates to \‘Your Requests page\’. This can be done from either the landing page or another unspecified task.\n\n6. From \‘Your Requests page\’, the \‘Employee - Procurement\’ can proceed with one of the following actions:\n - View requests that are saved as drafts.\n - View requests that are in progress.\n - View requests that are fulfilled and invoiced.\n\n7. If the employee chooses to view a request (either draft, in progress, or fulfilled and invoiced), they can then verify the line item details.\n\n8. The verification involves checking the Item Details, Shipping, Billing, and Additional Information sections, after which another unspecified task may be performed.\n\n9. The process ends with the \‘End Event\’ involving the \‘Employee - Procurement\’.\n\nPlease note that the unspecified tasks and gateway directions require further information and clarification.’

As described above, each of the above context prompts can be embedded into a multi-dimensional vector or process vector embedding (e.g., using the embedding model 122) and saved in a vector database. These process vector embeddings can be used to compare with a query vector embedding transformed from the user query to determine a target process matching the user query based on similarity assessment.

Example Tools of Autonomous Agents

As described above, for a given workflow, a set of tools (e.g., tools 148) can be created (e.g., by parsing an OpenAPI specification) in design phase and bound to the workflow. The set of tools can specify APIs used to perform tasks involved in the workflow. In runtime phase, an autonomous agent can use these tools to automatically execute certain tasks of the workflow by invoking relevant APIs specified by these tools.

In some examples, a given tool can be identified by a tool name and is accompanied by a tool description, which provides context for when and how the tool should be used by the LLM. In some examples, the tool can specify an API method (such as GET, POST, PUT, or DELETE) and an API endpoint, which is the URL that the tool will call when invoked. The outcome of this API call can be returned to the LLM for further processing. In some examples, the tool can also specify necessary parameters, which could be path, query, or body parameters, depending on the API's requirements. These parameters can include a name, a description, and a data type to ensure proper input and usage when the API is called.

As an example, the following lists one tool specifying an API that can be used to perform catalog search, which is the task for node 642 (“Search Catalogs”) of FIG. 6.

```
{
  "type": "function",
  "function": {
    "name": "catalog_search",
    "description": "This tool is used to search for a catalog item",
    "parameters": {
      "properties": {
        "query": { "description": "The query to search
        for", "type": "string"}
      },
      "required": ["query"],
      "type": "object"
    }
  }
}
```

Example LLM Graph

As described above, an autonomous agent created for a workflow (in design phase) can be deployed (in runtime phase) to guide the user to execute tasks in the workflow. Specifically, the autonomous agent can instantiate a state machine graph (e.g., the LLM graph 132) configured to control operation flow of a conversation session created between the end user and the LLM.

Figure 8:
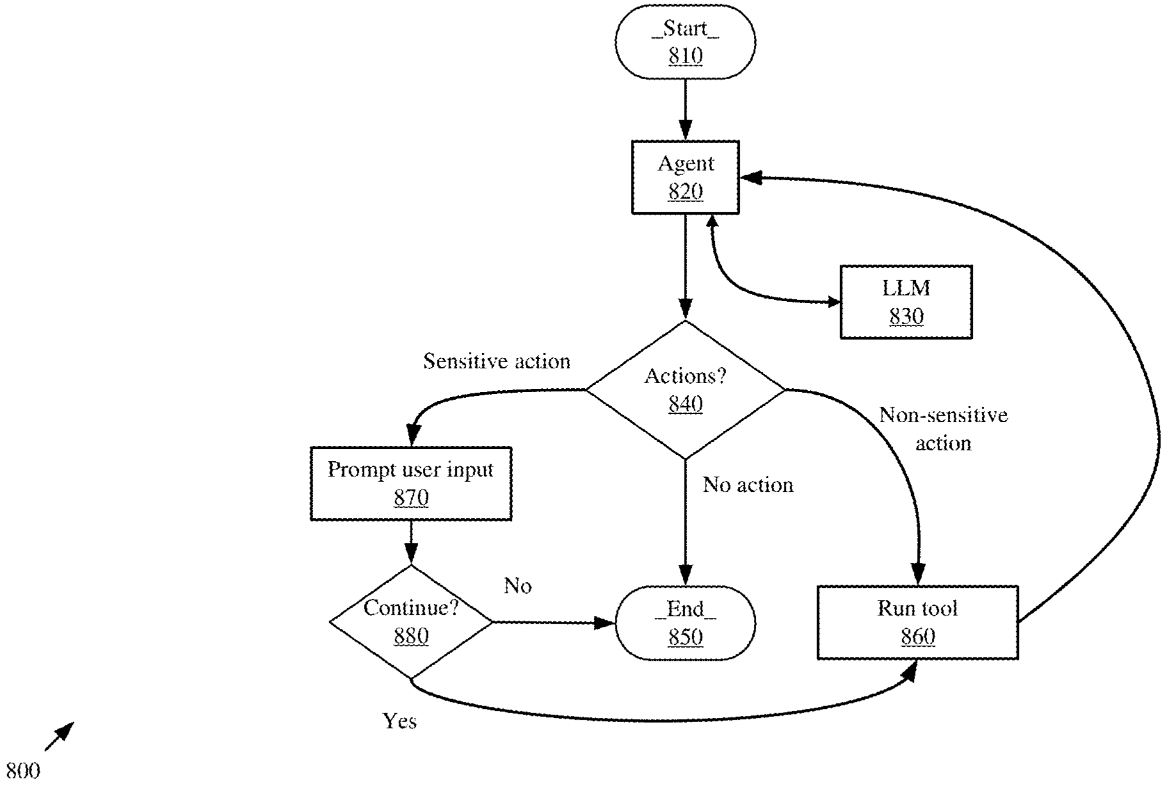
FIG. 8 is an example state machine graph depicting operational flow of an autonomous agent.

FIG. 8 depicts an example LLM graph 800 (implemented using LangGraph) which depicts operational flow of an autonomous agent for a workflow during runtime phase. The process begins at a _Start_node 810 which is triggered when the end user submits a user query pertinent to the workflow. After receiving the user query, the process transition to an Agent node 820, where the autonomous agent can determine a target process of the workflow that is most relevant to the user query. Specifically, the autonomous agent can generate a query vector embedding based on the user query and measure similarities between the query vector embedding and a plurality of process vector embeddings previously generated and stored in a vector database to identify the most relevant process (e.g., the process associated with the highest similarity score).

Then, the autonomous agent can prompt an LLM 830 to determine whether a specific task in the target process needs to be executed in response to the user query. Specifically, the autonomous agent can send the following information to the LLM 830 and ask if any API needs to be invoked (and if so, how): the user query, a context prompt describing the target process, and the set of tools bound to the workflow. If there are earlier user queries preceding the current user query, the autonomous agent can also send the conversation history to the LLM 830 to provide additional contextual information. Based on the provided information, the LLM can generate a response indicating whether an API (specified in the set of tools) needs to be called to execute the specific task in the target process, and if so, related metadata for invoking the API.

Based on the response generated by the LLM 830, the autonomous agent can perform a condition check at a gateway node 840 to determine what action to take. In certain cases, the response generated by the LLM 830 does not indicate any API call (i.e., no action) is needed. This can occur, for example, the user query is informational in nature, such as asking for clarification or additional details about a specific part of the workflow, or when the user requests general guidance on the workflow without initiating any specific task. In this situation, the autonomous agent can generate a reply (e.g., still using the LLM 830) to the end user and proceed to the _End_node 850 to end the conversation session.

In certain cases, the response generated by the LLM 830 indicates that an API call is required to execute a specific task in the target process. The autonomous agent can further determine whether executing the task represents a sensitive action or non-sensitive action. As described herein, a sensitive action represents a task, the execution of which requires a user intervention (e.g., requires the end user to confirm the execution or provide additional parameters), whereas a non-sensitive action can be automatically executed by the autonomous agent without requiring any further input or confirmation from the user. In some examples, an API call is considered a sensitive action if the API method is POST, PUT, or DELETE, while it is considered a non-sensitive action if the API method is GET.

For the non-sensitive action, the autonomous agent can move to a Run Tool node 860 to invoke the API indicated by the LLM 830 (with required metadata as necessary). As a result, the specific task is automatically executed by the autonomous agent. For the sensitive action, the autonomous agent can prompt a user input at node 870, asking for confirmation or providing required parameters. A condition check can be performed at node 880 based on the user input. If the user confirms or provides required parameters, the autonomous agent can move to the Run Tool node 860, where the API is automatically invoked by the autonomous agent to execute the specific task. Otherwise, if the user does not confirm or fails to provide the necessary parameters, the autonomous agent moves to the _End_node 850, effectively concluding the conversation session without executing the task.

After invoking the API to execute the specific task, the autonomous agent can return to the Agent node 820 to determine whether additional tasks need to be executed for the user query. For instance, to respond to the user query, multiple tasks of the target process may need to be executed in a specific order, and each task may require invocation of a corresponding API. For each task, the autonomous agent can identify the corresponding API (e.g., by prompting the LLM 830), determine what action to take at the gateway node 840, and continue this process of decision-making and execution until all required tasks are completed. If no further tasks are needed, the agent can then move to the _End_node 850 to conclude the conversation session.

Example Conversation-Aware Retriever Prompt

As described above, conversation history can be used by an autonomous agent to provide additional contextual information when prompting the LLM at runtime phase. Specifically, the autonomous agent can leverage the conversation history to rephrase or reformulate user queries, ensuring that each question can stand alone and be understood without relying on the previous conversation history. Listed below is an example code for implementing conversation-aware retriever prompt, which can be used to enhance query understanding and information retrieval in a conversational session.

```
from langchain_core.prompts import ChatPromptTemplate
from langchain.chains.history_aware_retriever import create_history_aware_retriever
from langchain_core.prompts import MessagePlaceholder
contextualize_q_system_prompt = (
  "Given a chat history and the latest user question "
  "which might reference context in the chat history, "
  "formulate a standalone question which can be understood "
  "without the chat history. Do NOT answer the question, "
  "just reformulate it if needed and otherwise return it as is."
)
contextualize_q_prompt = ChatPromptTemplate.from_messages(
  [
    ("system", contextualize_q_system_prompt),
```

-continued

```
      MessagesPlaceholder("chat__history"),
      ("human", "{input}")
   ]
)
def history__aware__retriever(llm, retriever):
   return create__history__aware__retriever(llm, retriever, contextualize__q__prompt)
```

In this example, the autonomous agent prompts the LLM using a prompt template that includes placeholders for both the conversation history ("chat_history") and the latest user query ("input"). The system prompt instructs the LLM to consider the chat history and reformulate the user query to make it independent of the previous conversations. This reformulated query is then passed on to the next stage in the prompt chain, where the relevant process information can be retrieved and utilized.

Example Invocation of APIs

As described above, during the design phase, an administrator can bind a set of tools to a specific workflow by defining classes for invoking APIs specified by the set of tools, enabling the execution of tasks within the workflow. As an example, listed below is a class for invoking an API (executed by the _run function) to perform catalog search, which is the task to be executed for node 642 ("Search Catalogs") depicted in FIG. 6.

```
class CatalogSearchTool(BaseTool):
   name = "catalog__search"
   description = "This tool is used to search for a catalog item"
   args__schema: Optional[Type[CatalogSearchModel]] = CatalogSearchModel
   headers: Optional[Headers] = None
   def __run(self, query: str):
      print("\n********** Inside CatalogSearchTool **********" , query, "\n")
      try:
         res = requests.get(
               os.environ.get("APPROUTER__URL")
+ f"/api/v1/mock/catalog/search?query={query}&index__name=latest__index__1&top__k=4",
            # headers={key: value for key, value in self.headers.items( )},
         )
      result = res.json( )
```

In some examples, the autonomous agent can be configured to implement a reasoning and acting (also referred to as "ReAct") prompt engineering technique, which can be used to guide the LLM in a step-by-step manner to solve complex tasks or interact with APIs. In the ReAct framework, the LLM is prompted to first reason through a problem by generating an explanation or logical sequence of thoughts. Then, based on this reasoning, it takes a specific action or makes a decision. Listed below is an example software implementation of the ReAct framework using LangChain.

```
from langchain_core.prompts import PromptTemplate
from tool.tools import RetrieverTool, DBTool
from rag.util.llm_model import LlmModel
from langchain.agents import AgentExecutor, create_react_agent
tools = [RetrieverTool( ), DBTool( )]
model = LlmModel( ).as_model( )
template = "You are an Intelligent Helpful assistant guiding users to follow a process. You
are given the process information.
{process_information}
You are also provided with user interaction history with process. Use only these knowledge
to reply relevant answer and avoid redundant information. If a user query cannot be solved
from above process steps, reply 'I do not have sufficient information'.
{history}
You have access to the following tools:
{tools}
Use the following format:
Question: the input question you must answer
Thought: you should always think about what to do
Action: the action to take, should be one of [{tool_names}]
Action Input: the input to the action
Observation: the result of the action
... (this Thought/Action/Action Input/Observation can repeat N times)
Thought: I now know the final answer
Final Answer: the final answer to the original input question
Begin!
Question: {input}
Thought:{agent_scratchpad}'"
prompt = PromptTemplate.from_template(template, input_variables=
["process_information", "history" ,"tools", "tool_names", "input", "agent_scratchpad"])
agent = create_react_agent(model, tools, prompt)
agent_executor = AgentExecutor(agent=agent, tools=tools, verbose=True,
handle_parsing_errors=True)
```

In this example, the code instantiates an intelligent agent ("agent") that interacts with a LLM ("LlmModel"). The PromptTemplate defines a structured prompt guiding the agent through a series of thought-action-observation steps to answer user queries. This template includes placeholders for process information, user interaction history, tools, tool names, and user input for planning tasks. The create_react_agent function initializes the agent with the specified model, tools, and prompt, while the AgentExecutor function executes the agent, ensuring verbose output and handling parsing errors. This setup enables the agent to reason through the given process information and user interaction history, dynamically creating and adjusting action plans to provide accurate and contextually relevant responses.

Example Use Cases

Figure 9:
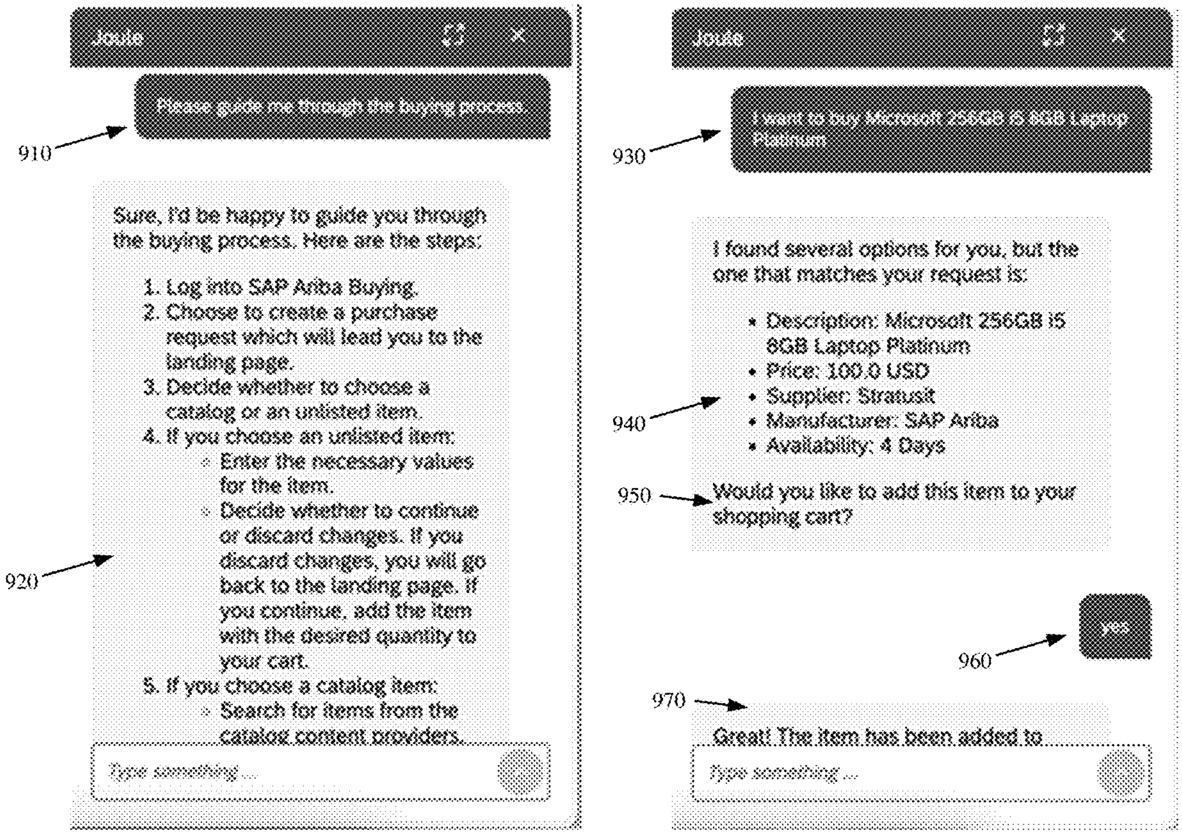
FIG. 9 shows an example use case where a user interacts with an autonomous agent.

FIG. 9 illustrates an example use case where an end user interacts with an autonomous agent during runtime phase. In this example, the end user interacts with the autonomous agent through Joule, which is an AI assistant or chatbot designed to streamline interactions with SAP S/4HANA ERP system.

As shown, the end user first enters an initial user query 910 "Please guide me through the buying process." Joule directs the user query 910 to the autonomous agent created for the "4AI-SAP Ariba Buying" workflow described above. The autonomous agent first instantiates an LLM graph (e.g., entering the _Start_node 810 of FIG. 8), then determines a target process of the workflow that is most relevant to the user query 910, e.g., based on measuring similarities between the query vector embedding generated from the user query 910 and process vector embeddings generated from context prompts (text descriptions) of the seven processes depicted in FIGS. 5-7. In this example, the first process 500 is identified as the target process. Both the user query 910 and the context prompt for the first process 500 are sent to the LLM, which in turn generates a response (e.g., providing step-by-step instructions to guide the user through the buying process). In this example, the LLM response does not indicate any tool execution (e.g., API call) is needed. Thus, the autonomous agent can generate an output 920 based on the LLM response (e.g., copying the step-by-step instructions to Joule), and proceed to the _End_node 850 to end the current conversation session.

In the depicted example, the end user enters another user query 930 "I want to buy Microsoft 256 GB i5 8 GB Laptop Platinum." Similarly, Joule directs the user query 910 to the autonomous agent created for the "4AI-SAP Ariba Buying" workflow, and the autonomous agent instantiates an LLM graph (e.g., entering the _Start_node 810 of FIG. 8). In this case, the autonomous agent also determines that the first process 500 is a target process which is most relevant to the user query 930. The autonomous agent then passes the context prompt corresponding to the first process 500 and the user query 930 (along with the conversation history) to the LLM, which in turn generates a response indicating that "catalog_search" API needs to be called to execute the task of node 642 ("Search Catalogs") of FIG. 6. Based on the LLM response, the autonomous agent determines that calling this API represents a non-sensitive action, thus the corresponding tool for catalog search is executed (e.g., calling the "catalog_search" API). The autonomous agent can display the catalog search results as an output 940 and send the same to the LLM for maintaining the context of the tool response.

The autonomous agent can continue the conversation by posting a question 950 if the user wants to add an item found through the catalog search to the user's shopping cart. The autonomous agent can determine, e.g., based on the LLM response, that another tool (e.g., calling the "add_to_cart" API) needs to be executed for adding an item to the shopping cart. However, since this API call represents a sensitive action that requires user confirmation, the autonomous agent pauses its operation and waits for the user's input. In this example, the user provides confirmation 960 by typing "yes." The LLM, having context of the conversation history, understands which product the user is referring to. Consequently, the autonomous agent calls the "add_to_cart" API to execute the task. The results of the API call are then passed to the LLM to maintain context and are also returned to the user as output 970, confirming that the item has been added to the shopping cart.

Example Advantages

The technologies described herein offer several technical advantages.

By leveraging generative AI, the disclosed technologies employ autonomous agents to efficiently manage the complexities of ERP workflows. These autonomous agents can be tailored to specific workflows during the design phase and subsequently deployed for runtime application within ERP systems. Once deployed, the autonomous agents can automatically execute tasks within the workflow, such as making API calls, thereby reducing the need for human intervention. For sensitive actions, the autonomous agents would only require the user's confirmation or input of necessary parameters, allowing users to manage workflows without needing to understand the technical details or underlying APIs.

The disclosed autonomous agents also incorporate intelligent decision-making capabilities. By dynamically interacting with a LLM, these autonomous agents can intelligently respond to user queries by identifying relevant processes, determining the need for specific actions, and executing tasks with minimal user intervention. Further, the autonomous agents can interactively guide users through the execution of tasks within a workflow, offering real-time assistance and ensuring that each step is completed accurately and efficiently, thereby improving overall user experience, reducing the potential for human error, and enhancing operational efficiency.

Example Computing Systems

Figure 10:
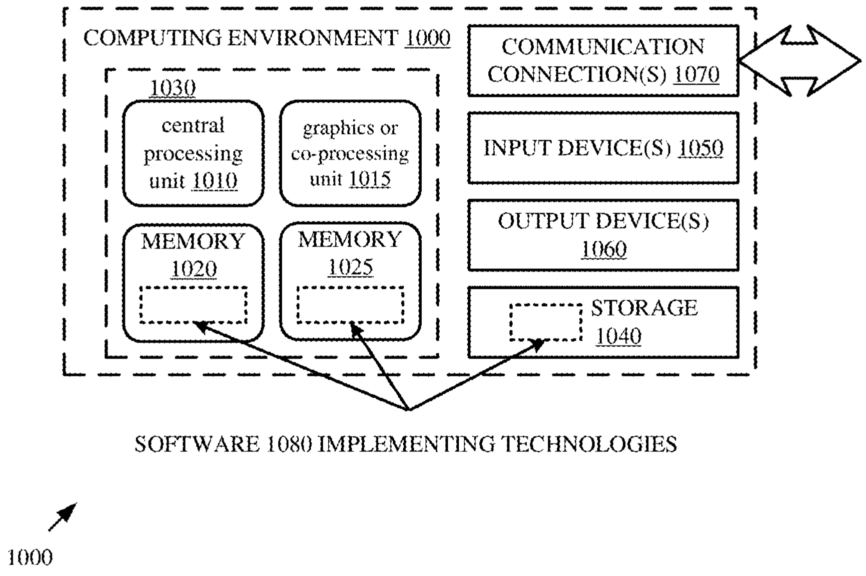
FIG. 10 is a block diagram of an example computing system in which described embodiments can be implemented.

FIG. 10 depicts an example of a suitable computing system 1000 in which the described innovations can be implemented. The computing system 1000 is not intended to suggest any limitation as to scope of use or functionality of the present disclosure, as the innovations can be implemented in diverse computing systems.

With reference to FIG. 10, the computing system 1000 includes one or more processing units 1010, 1015 and memory 1020, 1025. In FIG. 10, this basic configuration 1030 is included within a dashed line. The processing units 1010, 1015 can execute computer-executable instructions, such as for implementing the features described in the examples herein (e.g., the methods 200 and 300). A processing unit can be a general-purpose central processing unit (CPU), processor in an application-specific integrated circuit (ASIC), or any other type of processor. In a multi-processing system, multiple processing units can execute computer-executable instructions to increase processing power. For example, FIG. 10 shows a central processing unit 1010 as well as a graphics processing unit or co-processing unit 1015. The tangible memory 1020, 1025 can be volatile memory (e.g., registers, cache, RAM), non-volatile memory (e.g., ROM, EEPROM, flash memory, etc.), or some combination of the two, accessible by the processing unit(s) 1010, 1015. The memory 1020, 1025 can store software 1080 implementing one or more innovations described herein, in the form of computer-executable instructions suitable for execution by the processing unit(s) 1010, 1015.

A computing system 1000 can have additional features. For example, the computing system 1000 can include storage 1040, one or more input devices 1050, one or more output devices 1060, and one or more communication connections 1070, including input devices, output devices, and communication connections for interacting with a user. An interconnection mechanism (not shown) such as a bus, controller, or network can interconnect the components of the computing system 1000. Typically, operating system software (not shown) can provide an operating environment for other software executing in the computing system 1000, and coordinate activities of the components of the computing system 1000.

The tangible storage 1040 can be removable or non-removable, and includes magnetic disks, magnetic tapes or cassettes, CD-ROMs, DVDs, or any other medium which can be used to store information in a non-transitory way and which can be accessed within the computing system 1000. The storage 1040 can store instructions for the software implementing one or more innovations described herein.

The input device(s) 1050 can be an input device such as a keyboard, mouse, pen, or trackball, a voice input device, a scanning device, touch device (e.g., touchpad, display, or the like) or another device that provides input to the computing system 1000. The output device(s) 1060 can be a display, printer, speaker, CD-writer, or another device that provides output from the computing system 1000.

The communication connection(s) 1070 can enable communication over a communication medium to another computing entity. The communication medium can convey information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the context of computer-executable instructions, such as those included in program modules, being executed in a computing system on a target real or virtual processor (e.g., which is ultimately executed on one or more hardware processors). Generally, program modules or components can include routines, programs, libraries, objects, classes, components, data structures, etc. that perform particular tasks or implement particular abstract data types. The functionality of the program modules can be combined or split between program modules as desired in various embodiments. Computer-executable instructions for program modules can be executed within a local or distributed computing system.

For the sake of presentation, the detailed description uses terms like "determine" and "use" to describe computer operations in a computing system. These terms are high-level descriptions for operations performed by a computer and should not be confused with acts performed by a human being. The actual computer operations corresponding to these terms vary depending on implementation.

Computer-Readable Media

Any of the computer-readable media herein can be non-transitory (e.g., volatile memory such as DRAM or SRAM, nonvolatile memory such as magnetic storage, optical storage, or the like) and/or tangible. Any of the storing actions described herein can be implemented by storing in one or more computer-readable media (e.g., computer-readable storage media or other tangible media). Any of the things (e.g., data created and used during implementation) described as stored can be stored in one or more computer-readable media (e.g., computer-readable storage media or other tangible media). Computer-readable media can be limited to implementations not consisting of a signal.

Any of the methods described herein can be implemented by computer-executable instructions in (e.g., stored on, encoded on, or the like) one or more computer-readable media (e.g., computer-readable storage media or other tangible media) or one or more computer-readable storage devices (e.g., memory, magnetic storage, optical storage, or the like). Such instructions can cause a computing device to perform the method. The technologies described herein can be implemented in a variety of programming languages.

Example Cloud Computing Environment

Figure 11:
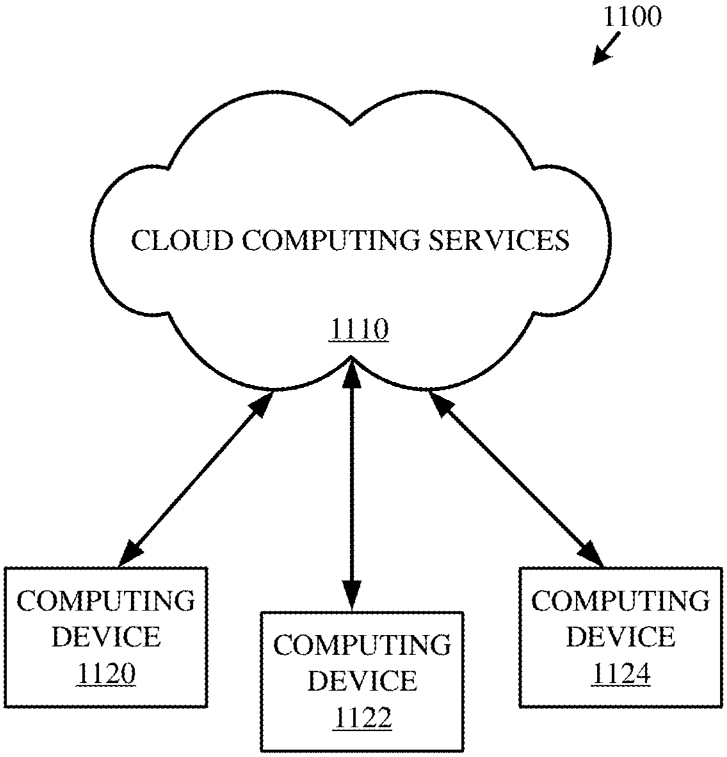
FIG. 11 is a block diagram of an example cloud computing environment that can be used in conjunction with the technologies described herein.

FIG. 11 depicts an example cloud computing environment 1100 in which the described technologies can be implemented, including, e.g., the system 100 and other systems herein. The cloud computing environment 1100 can include cloud computing services 1110. The cloud computing services 1110 can comprise various types of cloud computing resources, such as computer servers, data storage repositories, networking resources, etc. The cloud computing services 1110 can be centrally located (e.g., provided by a data center of a business or organization) or distributed (e.g., provided by various computing resources located at different locations, such as different data centers and/or located in different cities or countries).

The cloud computing services 1110 can be utilized by various types of computing devices (e.g., client computing devices), such as computing devices 1120, 1122, and 1124. For example, the computing devices (e.g., 1120, 1122, and 1124) can be computers (e.g., desktop or laptop computers), mobile devices (e.g., tablet computers or smart phones), or other types of computing devices. For example, the computing devices (e.g., 1120, 1122, and 1124) can utilize the cloud computing services 1110 to perform computing operations (e.g., data processing, data storage, and the like).

In practice, cloud-based, on-premises-based, or hybrid scenarios can be supported.

Example Implementations

In any of the examples herein, a software application (or "application") can take the form of a single application or a suite of a plurality of applications, whether offered as a service (SaaS), in the cloud, on premises, on a desktop, mobile device, wearable, or the like.

Although the operations of some of the disclosed methods are described in a particular, sequential order for convenient presentation, such manner of description encompasses rearrangement, unless a particular ordering is required by specific language set forth herein. For example, operations described sequentially can in some cases be rearranged or performed concurrently.

As described in this application and in the claims, the singular forms "a," "an," and "the" include the plural forms unless the context clearly dictates otherwise. Additionally, the term "includes" means "comprises." Further, "and/or" means "and" or "or," as well as "and" and "or."

Although specific prompt templates are described above, it should be understood that these prompt templates are merely examples for illustration purposes, and different prompt templates can be used based on the principles described herein.

In any of the examples described herein, an operation performed in real time means that the operation can be completed with negligible processing latency (e.g., the operation can be completed within one second or the like).

Example Clauses

Any of the following example clauses can be implemented.

Clause 1. A computing system for improving workflow automation, the computing system comprising: memory; one or more hardware processors coupled to the memory; and one or more computer readable storage media storing instructions that, when loaded into the memory, cause the one or more hardware processors to perform operations comprising: receiving a workflow including one or more processes, wherein a given process includes a plurality of tasks and links connecting the plurality of tasks, wherein the links define an operation sequence of the plurality of tasks; generating text descriptions of the one or more processes using a large language model; binding a set of tools to the workflow, wherein the set of tools specify one or more application programming interfaces (APIs) used to perform tasks involved in the workflow; and creating an autonomous agent configured to execute a selected task of the workflow in response to a user query, wherein the autonomous agent identifies the selected task based on comparison of the user query and the text descriptions of the one or more processes.

Clause 2. The computing system of clause 1, wherein the operations further comprise parsing a markup language definition of the workflow, and representing each process as a set of nodes in a process object, wherein the set of nodes represent the tasks of the process and are organized in a hierarchical relationship representing the operation sequence of the tasks.

Clause 3. The computing system of clause 2, wherein generating a text description of a selected process comprises prompting the large language model with a prompt including the process object representing the selected process.

Clause 4. The computing system of any one of clauses 1-3, wherein the operations further comprise parsing a document containing specifications of the one or more APIs and representing each tool as an API object containing information of a corresponding API.

Clause 5. The computing system of any one of clauses 1-4, wherein the operations further comprise generating process vector embeddings based on the text descriptions, wherein each process is associated with one specific process vector embedding.

Clause 6. The computing system of clause 5, wherein the operations further comprise indexing the process vector embeddings in a vector database.

Clause 7. The computing system of any one of clauses 5-6, wherein the autonomous agent is configured to generate a query vector embedding based on the user query and measure similarities between the query vector embedding and the process vector embeddings.

Clause 8. The computing system of clause 7, wherein the autonomous agent is configured to identify, among the one or more processes, a target process including the selected task based on the measured similarities, and prompt the large language model with both the user query and a text description of the target process.

Clause 9. The computing system of clause 8, wherein the autonomous agent is configured to receive a response from the large language model and determine whether the response specifies a target API for performing the selected task.

Clause 10. The computing system of clause 9, wherein the autonomous agent is configured to invoke the target API if the response specifies the target API.

Clause 11. A computer-implemented method for improving workflow automation, the method comprising: receiving a workflow including one or more processes, wherein a given process includes a plurality of tasks and links connecting the plurality of tasks, wherein the links define an operation sequence of the plurality of tasks; generating text descriptions of the one or more processes using a large language model; binding a set of tools to the workflow, wherein the set of tools specify one or more application programming interfaces (APIs) used to perform tasks involved in the workflow; and creating an autonomous agent configured to execute a selected task of the workflow in response to a user query, wherein the autonomous agent identifies the selected task based on comparison of the user query and the text descriptions of the one or more processes.

Clause 12. The computer-implemented method of clause 11, further comprising parsing a markup language definition of the workflow, and representing each process as a set of nodes in a process object, wherein the set of nodes represent the tasks of the process and are organized in a hierarchical relationship representing the operation sequence of the tasks.

Clause 13. The computer-implemented method of clause 12, wherein generating a text description of a selected process comprises prompting the large language model with a prompt including the process object representing the selected process.

Clause 14. The computer-implemented method of any one of clauses 11-13, wherein the operations further comprise parsing a document containing specifications of the one or more APIs and representing each tool as an API object containing information of a corresponding API.

Clause 15. The computer-implemented method of any one of clauses 11-14, further comprising generating process vector embeddings based on the text descriptions, wherein each process is associated with one specific process vector embedding.

Clause 16. The computer-implemented method of clause 15, wherein the autonomous agent is configured to generate a query vector embedding based on the user query and measure similarities between the query vector embedding and the process vector embeddings.

Clause 17. The computer-implemented method of clause 16, wherein the autonomous agent is configured to identify, among the one or more processes, a target process including the selected task based on the measured similarities, and prompt the large language model with both the user query and a text description of the target process.

Clause 18. The computer-implemented method of clause 17, wherein the autonomous agent is configured to receive a response from the large language model and determine whether the response specifies a target API for performing the selected task.

Clause 19. The computer-implemented method of clause 18, wherein the autonomous agent is configured to invoke the target API if the response specifies the target API.

Clause 20. One or more non-transitory computer-readable media having encoded thereon computer-executable instructions causing one or more processors to perform a method for improving workflow automation, the method comprising: receiving a workflow including one or more processes, wherein a given process includes a plurality of tasks and links connecting the plurality of tasks, wherein the links define an operation sequence of the plurality of tasks; generating text descriptions of the one or more processes using a large language model; binding a set of tools to the workflow, wherein the set of tools specify one or more application programming interfaces (APIs) used to perform tasks involved in the workflow; and creating an autonomous agent configured to execute a selected task of the workflow in response to a user query, wherein the autonomous agent identifies the selected task based on comparison of the user query and the text descriptions of the one or more processes.

Clause 21. A computing system for improving process flow automation in an enterprise resource planning (ERP) platform, the computing system comprising: memory; one or more hardware processors coupled to the memory; and one or more computer readable storage media storing instructions that, when loaded into the memory, cause the one or more hardware processors to perform operations comprising: receiving a user query from a user interface of the ERP platform; identifying a target process including a selected task that matches the user query, wherein the target process is one of a plurality of processes included in a process workflow, wherein the target process includes a plurality of tasks and links connecting the plurality of tasks, wherein the links define an operation sequence of the plurality of tasks; retrieving a context prompt describing the target process; prompting a large language model with the user query and the context prompt; receiving a response generated by the large language model; and generating an output on the user interface based on the response.

Clause 22. The computing system of clause 21, wherein the operations further comprise embedding the user query into a query vector.

Clause 23. The computing system of clause 22, wherein identifying the target process comprises measuring similarities between the query vector and a plurality of process vectors representing the plurality of processes included in the process workflow.

Clause 24. The computing system of clause 23, wherein the operations further comprise generating the plurality of process vectors by embedding respective context prompts describing the plurality of processes included in the process workflow.

Clause 25. The computing system of clause 24, wherein the operations further comprise generating the context prompts describing the plurality of processes included in the process flow, wherein generating the context prompt for a selected process comprises prompting the large language model with a prompt including an object representing the selected process.

Clause 26. The computing system of clause 25, wherein the operations further comprise parsing a markup language definition of the process flow, and representing the selected process as a set of nodes in the object, wherein the set of nodes represent the tasks of the selected process and are organized in a hierarchical relationship representing the operation sequence of the tasks.

Clause 27. The computing system of any one of clauses 21-26, wherein the user query is one of a plurality of user queries received in a query session, wherein prompting the large language model includes sending a history of query session to the large language model, wherein the history of the query session stores the plurality of user queries and corresponding responses generated by the large language model.

Clause 28. The computing system of any one of clauses 21-27, wherein the operations further comprise detecting whether the response specifies an application programming interface (API).

Clause 29. The computing system of clause 28, wherein the operations further comprise invoking the API to perform a selected task of the target process responsive to detecting that the API is specified in the response.

Clause 30. The computing system of clause 29, wherein the operations further comprise: responsive to detecting that the selected task requires user intervention, prompting a user input on the user interface, and conditioning invocation of the API based on the user input.

Clause 31. A computer-implemented method for improving process flow automation in an enterprise resource planning (ERP) platform, the method comprising: receiving a user query from a user interface of the ERP platform; identifying a target process including a selected task that matches the user query, wherein the target process is one of a plurality of processes included in a process workflow, wherein the target process includes a plurality of tasks and links connecting the plurality of tasks, wherein the links define an operation sequence of the plurality of tasks; retrieving a context prompt describing the target process; prompting a large language model with the user query and the context prompt; receiving a response generated by the large language model; and generating an output on the user interface based on the response.

Clause 32. The computer-implemented method of clause 31, further comprising embedding the user query into a query vector.

Clause 33. The computer-implemented method of clause 32, wherein identifying the target process comprises measuring similarities between the query vector and a plurality of process vectors representing the plurality of processes included in the process workflow.

Clause 34. The computer-implemented method of clause 33, wherein the operations further comprise generating the plurality of process vectors by embedding respective context prompts describing the plurality of processes included in the process workflow.

Clause 35. The computer-implemented method of clause 34, further comprising generating the context prompts describing the plurality of processes included in the process flow, wherein generating the context prompt for a selected process comprises prompting the large language model with a prompt including an object representing the selected process.

Clause 36. The computer-implemented method of clause 35, further comprising parsing a markup language definition of the process flow, and representing the selected process as a set of nodes in the object, wherein the set of nodes represent the tasks of the selected process and are organized in a hierarchical relationship representing the operation sequence of the tasks.

Clause 37. The computer-implemented method of any one of clauses 31-36, further comprising detecting whether the response specifies an application programming interface (API).

Clause 38. The computer-implemented method of clause 37, further comprising invoking the API to perform a selected task of the target process responsive to detecting that the API is specified in the response.

Clause 39. The computer-implemented method of clause 38, further comprising: responsive to detecting that the selected task requires user intervention, prompting a user input on the user interface, and conditioning invocation of the API based on the user input.

Clause 40. One or more non-transitory computer-readable media having encoded thereon computer-executable instructions causing one or more processors to perform a method for improving process flow automation in an enterprise resource planning (ERP) platform, the method comprising: receiving a user query from a user interface of the ERP platform; identifying a target process including a selected task that matches the user query, wherein the target process is one of a plurality of processes included in a process workflow, wherein the target process includes a plurality of tasks and links connecting the plurality of tasks, wherein the links define an operation sequence of the plurality of tasks; retrieving a context prompt describing the target process; prompting a large language model with the user query and the context prompt; receiving a response generated by the large language model; and generating an output on the user interface based on the response.

Example Alternatives

The technologies from any example can be combined with the technologies described in any one or more of the other examples. In view of the many possible embodiments to which the principles of the disclosed technology can be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

What is claimed is:

1. A computing system for improving workflow automation in an enterprise resource planning (ERP) platform, the computing system comprising:

memory;

one or more hardware processors coupled to the memory; and one or more computer readable storage media storing instructions that, when loaded into the memory, cause the one or more hardware processors to perform operations comprising:

receiving, by a workflow assistant, a workflow including one or more processes, wherein a given process includes a plurality of tasks and links connecting the plurality of tasks, wherein the links define an operation sequence of the plurality of tasks, wherein the workflow is defined by a markup language definition that structurally describes the one or more processes, tasks of the one or more processes, and interconnections among the tasks;

compiling the workflow by a workflow engine, wherein compiling the workflow comprises:

automatically parsing, in real time and by a workflow indexing pipeline of the workflow engine, the markup language definition of the workflow to convert each process in the workflow into a respective process object, wherein converting each process comprises representing the process as a set of nodes in the respective process object, wherein the set of nodes represent the tasks of the process and are organized in a hierarchical relationship representing the operation sequence of the tasks;

automatically generating, in real time and by a data pre-processor of the workflow engine, text descriptions of the one or more processes using a large language model, wherein generating the text descriptions comprises iteratively prompting the large language model with a respective prompt including the respective process object representing the corresponding process, wherein the respective text description is generated based on information contained in the respective process object; and automatically generating, in real time and by the data pre-processor, process vector embeddings based on the text descriptions, and indexing the process vector embeddings in a vector database, wherein each process is associated with one specific process vector embedding;

generating, by a tools adaptor of the workflow assistant, a set of tools, wherein the set of tools specify one or more application programming interfaces (APIs) used to perform tasks involved in the workflow;

binding the set of tools to the workflow;

creating an autonomous agent configured to execute a selected task of the workflow in response to a user query, wherein the autonomous agent identifies the selected task based on comparison of the user query and the text descriptions of the one or more processes and determines whether at least one API specified by the set of tools bound to the workflow is usable to execute the selected task;

deploying the autonomous agent on the ERP platform; and after deploying the autonomous agent on the ERP platform, responsive to determining that the at least one API specified by the set of tools bound to the workflow is usable to execute the selected task, automatically invoking, by the autonomous agent, the at least one API to execute the selected task.

2. The computing system of claim 1, wherein generating the set of tools comprises parsing a document containing specifications of the one or more APIs and representing each tool as an API object containing information of a corresponding API.

3. The computing system of claim 1, wherein the autonomous agent is configured to generate a query vector embedding based on the user query and measure similarities between the query vector embedding and the process vector embeddings.

4. The computing system of claim 3, wherein the autonomous agent is configured to identify, among the one or more processes, a target process including the selected task based on the measured similarities, and prompt the large language model with both the user query and a text description of the target process.

5. The computing system of claim 4, wherein the autonomous agent is configured to receive a response from the large language model and determine whether the response specifies a target API for performing the selected task.

6. A computer-implemented method for improving workflow automation in an enterprise resource planning (ERP) platform, the method comprising:

receiving, by a workflow assistant, a workflow including one or more processes, wherein a given process includes a plurality of tasks and links connecting the plurality of tasks, wherein the links define an operation sequence of the plurality of tasks, wherein the workflow is defined by a markup language definition that structurally describes the one or more processes, tasks of the one or more processes, and interconnections among the tasks;

compiling the workflow by a workflow engine, wherein compiling the workflow comprises:

automatically parsing, in real time and by a workflow indexing pipeline of the workflow engine, the markup language definition of the workflow to convert each process in the workflow into a respective process object, wherein converting each process comprises representing the process as a set of nodes in the respective process object, wherein the set of nodes represent the tasks of the process and are organized in a hierarchical relationship representing the operation sequence of the tasks;

automatically generating, in real time and by a data pre-processor of the workflow engine, text descriptions of the one or more processes using a large language model, wherein generating the text descriptions comprises iteratively prompting the large language model with a respective prompt including the respective process object representing the corresponding process, wherein the respective text description is generated based on information contained in the respective process object; and automatically generating, in real time and by the data pre-processor, process vector embeddings based on the text descriptions, and indexing the process vector embeddings in a vector database, wherein each process is associated with one specific process vector embedding;

generating, by a tools adaptor of the workflow assistant, a set of tools, wherein the set of tools specify one or more application programming interfaces (APIs) used to perform tasks involved in the workflow;

binding the set of tools to the workflow;

creating an autonomous agent configured to execute a selected task of the workflow in response to a user query, wherein the autonomous agent identifies the selected task based on comparison of the user query and the text descriptions of the one or more processes and determines whether at least one API specified by the set of tools bound to the workflow is usable to execute the selected task;

deploying the autonomous agent on the ERP platform; and after deploying the autonomous agent on the ERP platform, responsive to determining that the at least one API specified by the set of tools bound to the workflow is usable to execute the selected task, automatically invoking, by the autonomous agent, the at least one API to execute the selected task.

7. The computer-implemented method of claim 6, wherein generating the set of tools comprises parsing a document containing specifications of the one or more APIs and representing each tool as an API object containing information of a corresponding API.

8. The computer-implemented method of claim 6, wherein the autonomous agent is configured to generate a query vector embedding based on the user query and measure similarities between the query vector embedding and the process vector embeddings.

9. The computer-implemented method of claim 8, wherein the autonomous agent is configured to identify, among the one or more processes, a target process including the selected task based on the measured similarities, and prompt the large language model with both the user query and a text description of the target process.

10. The computer-implemented method of claim 9, wherein the autonomous agent is configured to receive a response from the large language model and determine whether the response specifies a target API for performing the selected task.

11. One or more non-transitory computer-readable media having encoded thereon computer-executable instructions causing one or more processors to perform a method for improving workflow automation in an enterprise resource planning (ERP) platform, the method comprising:

receiving, by a workflow assistant, a workflow including one or more processes, wherein a given process includes a plurality of tasks and links connecting the plurality of tasks, wherein the links define an operation sequence of the plurality of tasks, wherein the workflow is defined by a markup language definition that structurally describes the one or more processes, tasks of the one or more processes, and interconnections among the tasks;

compiling the workflow by a workflow engine, wherein compiling the workflow comprises:

automatically parsing, in real time and by a workflow indexing pipeline of the workflow engine, the markup language definition of the workflow to convert each process in the workflow into a respective process object, wherein converting each process comprises representing the process as a set of nodes in the respective process object, wherein the set of nodes represent the tasks of the process and are organized in a hierarchical relationship representing the operation sequence of the tasks;

automatically generating, in real time and by a data pre-processor of the workflow engine, text descriptions of the one or more processes using a large language model, wherein generating the text descriptions comprises iteratively prompting the large language model with a respective prompt including the respective process object representing the corresponding process, wherein the respective text description is generated based on information contained in the respective process object; and automatically generating, in real time and by the data pre-processor, process vector embeddings based on the text descriptions, and indexing the process vector embeddings in a vector database, wherein each process is associated with one specific process vector embedding;

generating, by a tools adaptor of the workflow assistant, a set of tools, wherein the set of tools specify one or more application programming interfaces (APIs) used to perform tasks involved in the workflow;

binding the set of tools to the workflow;

creating an autonomous agent configured to execute a selected task of the workflow in response to a user query, wherein the autonomous agent identifies the selected task based on comparison of the user query and the text descriptions of the one or more processes and determines whether at least one API specified by the set of tools bound to the workflow is usable to execute the selected task;

deploying the autonomous agent on the ERP platform; and after deploying the autonomous agent on the ERP platform, responsive to determining that the at least one API specified by the set of tools bound to the workflow is usable to execute the selected task, automatically invoking, by the autonomous agent, the at least one API to execute the selected task.

* * * * *